(12) United States Patent
McBride et al.

(10) Patent No.: US 8,474,255 B2
(45) Date of Patent: Jul. 2, 2013

(54) FORMING LIQUID SPRAYS IN COMPRESSED-GAS ENERGY STORAGE SYSTEMS FOR EFFECTIVE HEAT EXCHANGE

(75) Inventors: Troy O. McBride, Norwich, VT (US); Alexander Bell, Hanover, NH (US); Benjamin R. Bollinger, Windsor, VT (US); Andrew Shang, Lebanon, NH (US); David Chmiel, West Lebanon, NH (US); Horst Richter, Norwich, VT (US); Patrick Magari, Plainfield, NH (US); Benjamin Cameron, Hanover, NH (US)

(73) Assignee: SustainX, Inc., Seabrook, NH (US)

( * ) Notice: Subject to any disclaimer, the term of this patent is extended or adjusted under 35 U.S.C. 154(b) by 180 days.

(21) Appl. No.: 13/105,986

(22) Filed: May 12, 2011

(65) Prior Publication Data

US 2011/0314803 A1 Dec. 29, 2011

Related U.S. Application Data

(63) Continuation-in-part of application No. 12/639,703, filed on Dec. 16, 2009, now Pat. No. 8,225,606, which (Continued)

(51) Int. Cl.
*F01K 21/04* (2006.01)
*F01B 29/00* (2006.01)
*F16D 31/02* (2006.01)

(52) U.S. Cl.
USPC .................. 60/511; 60/512; 60/408; 60/417

(58) Field of Classification Search
USPC .................. 60/407, 410, 412, 413, 415, 416, 60/508, 511, 512, 514, 659; 239/461–524; 91/34, 160, 166, 274, 285, 462; 417/403, 417/404
See application file for complete search history.

(56) References Cited

U.S. PATENT DOCUMENTS 114,297 A 5/1871 Ivens et al.
224,081 A 2/1880 Eckart (Continued)

FOREIGN PATENT DOCUMENTS

BE 898225 3/1984
BE 1008885 8/1996

(Continued)

OTHER PUBLICATIONS

International Search Report and Written Opinion mailed May 25, 2011 for International Application No. PCT/US2010/027138, 12 pages.

(Continued)

*Primary Examiner* — Kenneth Bomberg
*Assistant Examiner* — Christopher Jetton
(74) *Attorney, Agent, or Firm* — Bingham McCutchen LLP

(57) ABSTRACT

In various embodiments, efficiency of energy storage and recovery systems compressing and expanding gas is improved via heat exchange between the gas and a heat-transfer fluid.

20 Claims, 24 Drawing Sheets

Related U.S. Application Data

(63) is a continuation-in-part of application No. 12/421,057, filed on Apr. 9, 2009, now Pat. No. 7,832,207, said application No. 11/639,703 is a continuation-in-part of application No. 12/481,235, filed on Jun. 9, 2009, now Pat. No. 7,802,426.

(60) Provisional application No. 61/334,722, filed on May 14, 2010, provisional application No. 61/349,009, filed on May 27, 2010, provisional application No. 61/363,072, filed on Jul. 9, 2010, provisional application No. 61/393,725, filed on Oct. 15, 2010, provisional application No. 61/148,691, filed on Jan. 30, 2009, provisional application No. 61/043,630, filed on Apr. 9, 2008, provisional application No. 61/059,964, filed on Jun. 9, 2008, provisional application No. 61/166,448, filed on Apr. 3, 2009, provisional application No. 61/184,166, filed on Jun. 4, 2009, provisional application No. 61/223,564, filed on Jul. 7, 2009, provisional application No. 61/227,222, filed on Jul. 21, 2009, provisional application No. 61/251,965, filed on Oct. 15, 2009.

(56) References Cited

U.S. PATENT DOCUMENTS

| | | |
|---|---|---|
| 233,432 A | 10/1880 | Pitchford |
| 1,353,216 A | 9/1920 | Carlson |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushing |
| 2,628,564 A | 2/1953 | Jacobs |
| 2,632,995 A | 3/1953 | Noe |
| 2,712,728 A | 7/1955 | Lewis et al. |
| 2,813,398 A | 11/1957 | Wilcox |
| 2,829,501 A * | 4/1958 | Walls ............................ 60/659 |
| 2,880,759 A | 4/1959 | Wisman |
| 3,041,842 A | 7/1962 | Heinecke |
| 3,100,965 A | 8/1963 | Blackburn |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Riqollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 3,999,388 A | 12/1976 | Nystrom |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,075,844 A | 2/1978 | Schiferli |
| 4,089,744 A | 5/1978 | Cahn |
| 4,094,356 A | 6/1978 | Ash et al. |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,194,889 A | 3/1980 | Wanner |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A * | 7/1981 | Ahrens et al. ................ 290/1 R |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |

| | | | | | |
|---|---|---|---|---|---|
| 4,375,387 A | 3/1983 | deFilippi et al. | 5,133,190 A | 7/1992 | Abdelmalek |
| 4,380,419 A | 4/1983 | Morton | 5,138,838 A | 8/1992 | Crosser |
| 4,392,062 A | 7/1983 | Bervig | 5,140,170 A | 8/1992 | Henderson |
| 4,393,752 A | 7/1983 | Meier | 5,152,260 A | 10/1992 | Erickson et al. |
| 4,411,136 A | 10/1983 | Funk | 5,161,449 A | 11/1992 | Everett, Jr. |
| 4,416,114 A | 11/1983 | Martini | 5,169,295 A | 12/1992 | Stogner et al. |
| 4,421,661 A | 12/1983 | Claar et al. | 5,182,086 A | 1/1993 | Henderson et al. |
| 4,428,711 A | 1/1984 | Archer | 5,203,168 A | 4/1993 | Oshina |
| 4,435,131 A | 3/1984 | Ruben | 5,209,063 A | 5/1993 | Shirai et al. |
| 4,444,011 A | 4/1984 | Kolin | 5,213,470 A | 5/1993 | Lundquist |
| 4,446,698 A | 5/1984 | Benson | 5,239,833 A | 8/1993 | Fineblum |
| 4,447,738 A | 5/1984 | Allison | 5,259,345 A | 11/1993 | Richeson |
| 4,449,372 A | 5/1984 | Rilett | 5,271,225 A | 12/1993 | Adamides |
| 4,452,046 A | 6/1984 | Valentin | 5,279,206 A | 1/1994 | Krantz |
| 4,452,047 A | 6/1984 | Hunt et al. | 5,296,799 A | 3/1994 | Davis |
| 4,454,429 A | 6/1984 | Buonome | 5,309,713 A | 5/1994 | Vassallo |
| 4,454,720 A | 6/1984 | Leibowitz | 5,321,946 A | 6/1994 | Abdelmalek |
| 4,455,834 A | 6/1984 | Earle | 5,327,987 A | 7/1994 | Abdelmalek |
| 4,462,213 A | 7/1984 | Lewis | 5,339,633 A | 8/1994 | Fujii et al. |
| 4,474,002 A | 10/1984 | Perry | 5,341,644 A | 8/1994 | Nelson |
| 4,476,851 A | 10/1984 | Brugger et al. | 5,344,627 A | 9/1994 | Fujii et al. |
| 4,478,553 A | 10/1984 | Leibowitz et al. | 5,364,611 A | 11/1994 | Iijima et al. |
| 4,489,554 A | 12/1984 | Otters | 5,365,980 A | 11/1994 | Deberardinis |
| 4,491,739 A | 1/1985 | Watson | 5,375,417 A | 12/1994 | Barth |
| 4,492,539 A | 1/1985 | Specht | 5,379,589 A | 1/1995 | Cohn et al. |
| 4,493,189 A | 1/1985 | Slater | 5,384,489 A | 1/1995 | Bellac |
| 4,496,847 A | 1/1985 | Parkins | 5,387,089 A | 2/1995 | Stogner et al. |
| 4,498,848 A | 2/1985 | Petrovsky | 5,394,693 A | 3/1995 | Plyter |
| 4,502,284 A | 3/1985 | Chrisoghilos | 5,427,194 A | 6/1995 | Miller |
| 4,503,673 A | 3/1985 | Schachle | 5,436,508 A | 7/1995 | Sorensen |
| 4,515,516 A | 5/1985 | Perrine et al. | 5,448,889 A | 9/1995 | Bronicki |
| 4,520,840 A | 6/1985 | Michel | 5,454,408 A | 10/1995 | Dibella et al. |
| 4,525,631 A | 6/1985 | Allison | 5,454,426 A | 10/1995 | Moseley |
| 4,530,208 A | 7/1985 | Sato | 5,467,722 A | 11/1995 | Meratla |
| 4,547,209 A | 10/1985 | Netzer | 5,477,677 A | 12/1995 | Krnavek |
| 4,574,592 A | 3/1986 | Eskeli | 5,491,969 A | 2/1996 | Cohn et al. |
| 4,585,039 A | 4/1986 | Hamilton | 5,491,977 A | 2/1996 | Cho |
| 4,589,475 A | 5/1986 | Jones | 5,524,821 A | 6/1996 | Vie et al. |
| 4,593,202 A | 6/1986 | Dickinson | 5,537,822 A | 7/1996 | Shnaid et al. |
| 4,619,225 A | 10/1986 | Lowther | 5,544,698 A | 8/1996 | Paulman |
| 4,624,623 A | 11/1986 | Wagner | 5,557,934 A | 9/1996 | Beach |
| 4,648,801 A | 3/1987 | Wilson | 5,561,978 A | 10/1996 | Buschur |
| 4,651,525 A | 3/1987 | Cestero | 5,562,010 A | 10/1996 | McGuire |
| 4,653,986 A | 3/1987 | Ashton | 5,579,640 A | 12/1996 | Gray, Jr. et al. |
| 4,671,742 A | 6/1987 | Gyimesi | 5,584,664 A | 12/1996 | Elliott et al. |
| 4,676,068 A | 6/1987 | Funk | 5,592,028 A | 1/1997 | Pritchard |
| 4,679,396 A | 7/1987 | Heggie | 5,595,587 A * | 1/1997 | Steed ............................... 96/27 |
| 4,691,524 A | 9/1987 | Holscher | 5,598,736 A | 2/1997 | Erskine |
| 4,693,080 A | 9/1987 | Van Hooff | 5,599,172 A | 2/1997 | Mccabe |
| 4,706,456 A | 11/1987 | Backe | 5,600,953 A | 2/1997 | Oshita et al. |
| 4,707,988 A | 11/1987 | Palmers | 5,616,007 A | 4/1997 | Cohen |
| 4,710,100 A | 12/1987 | Laing et al. | 5,634,340 A | 6/1997 | Grennan |
| 4,735,552 A | 4/1988 | Watson | 5,641,273 A | 6/1997 | Moseley |
| 4,739,620 A | 4/1988 | Pierce | 5,674,053 A | 10/1997 | Paul et al. |
| 4,760,697 A | 8/1988 | Heggie | 5,685,154 A | 11/1997 | Bronicki et al. |
| 4,761,118 A | 8/1988 | Zanarini et al. | 5,685,155 A | 11/1997 | Brown |
| 4,765,142 A | 8/1988 | Nakhamkin | 5,768,893 A | 6/1998 | Hoshino et al. |
| 4,765,143 A | 8/1988 | Crawford et al. | 5,769,610 A | 6/1998 | Paul et al. |
| 4,767,938 A | 8/1988 | Bervig | 5,771,693 A | 6/1998 | Coney |
| 4,792,700 A | 12/1988 | Ammons | 5,775,107 A | 7/1998 | Sparkman |
| 4,849,648 A | 7/1989 | Longardner | 5,778,675 A | 7/1998 | Nakhamkin |
| 4,870,816 A | 10/1989 | Nakhamkin | 5,794,442 A | 8/1998 | Lisniansky |
| 4,872,307 A | 10/1989 | Nakhamkin | 5,797,980 A | 8/1998 | Fillet |
| 4,873,828 A | 10/1989 | Laing et al. | 5,819,533 A | 10/1998 | Moonen |
| 4,873,831 A | 10/1989 | Dehne | 5,819,635 A | 10/1998 | Moonen |
| 4,876,992 A | 10/1989 | Sobotowski | 5,831,757 A | 11/1998 | DiFrancesco |
| 4,877,530 A | 10/1989 | Moses | 5,832,728 A | 11/1998 | Buck |
| 4,885,912 A | 12/1989 | Nakhamkin | 5,832,906 A | 11/1998 | Douville et al. |
| 4,886,534 A | 12/1989 | Castan | 5,839,270 A | 11/1998 | Jirnov et al. |
| 4,907,495 A | 3/1990 | Sugahara | 5,845,479 A | 12/1998 | Nakhamkin |
| 4,936,109 A | 6/1990 | Longardner | 5,873,250 A | 2/1999 | Lewis |
| 4,942,736 A | 7/1990 | Bronicki | 5,901,809 A | 5/1999 | Berkun |
| 4,947,977 A | 8/1990 | Raymond | 5,924,283 A | 7/1999 | Burke, Jr. |
| 4,955,195 A | 9/1990 | Jones et al. | 5,934,063 A | 8/1999 | Nakhamkin |
| 4,984,432 A | 1/1991 | Corey | 5,934,076 A | 8/1999 | Coney |
| 5,056,601 A | 10/1991 | Grimmer | 5,937,652 A | 8/1999 | Abdelmalek |
| 5,058,385 A | 10/1991 | Everett, Jr. | 5,971,027 A | 10/1999 | Beachley et al. |
| 5,062,498 A | 11/1991 | Tobias | 6,012,279 A | 1/2000 | Hines |
| 5,107,681 A | 4/1992 | Wolfbauer, III | 6,023,105 A | 2/2000 | Youssef |

| Patent | Kind | Date | Name |
|---|---|---|---|
| 6,026,349 | A | 2/2000 | Heneman |
| 6,029,445 | A | 2/2000 | Lech |
| 6,073,445 | A | 6/2000 | Johnson |
| 6,073,448 | A | 6/2000 | Lozada |
| 6,085,520 | A | 7/2000 | Kohno |
| 6,090,186 | A | 7/2000 | Spencer |
| 6,119,802 | A | 9/2000 | Puett, Jr. |
| 6,132,181 | A | 10/2000 | Mccabe |
| 6,145,311 | A | 11/2000 | Cyphelly |
| 6,148,602 | A | 11/2000 | Demetri |
| 6,153,943 | A | 11/2000 | Mistr, Jr. |
| 6,158,499 | A | 12/2000 | Rhodes |
| 6,170,443 | B1 | 1/2001 | Hofbauer |
| 6,178,735 | B1 | 1/2001 | Frutschi |
| 6,179,446 | B1 | 1/2001 | Sarmadi |
| 6,188,182 | B1 | 2/2001 | Nickols et al. |
| 6,202,707 | B1 | 3/2001 | Woodall et al. |
| 6,206,660 | B1 * | 3/2001 | Coney et al. ............ 417/438 |
| 6,210,131 | B1 | 4/2001 | Whitehead |
| 6,216,462 | B1 | 4/2001 | Gray, Jr. |
| 6,225,706 | B1 | 5/2001 | Keller |
| 6,276,123 | B1 | 8/2001 | Chen et al. |
| 6,327,858 | B1 | 12/2001 | Negre et al. |
| 6,327,994 | B1 | 12/2001 | Labrador |
| 6,349,543 | B1 | 2/2002 | Lisniansky |
| RE37,603 | E | 3/2002 | Coney |
| 6,352,576 | B1 | 3/2002 | Spencer et al. |
| 6,360,535 | B1 | 3/2002 | Fisher |
| 6,367,570 | B1 | 4/2002 | Long, III |
| 6,372,023 | B1 | 4/2002 | Kiyono et al. |
| 6,389,814 | B2 | 5/2002 | Viteri et al. |
| 6,397,578 | B2 | 6/2002 | Tsukamoto |
| 6,401,458 | B2 | 6/2002 | Jacobson |
| 6,407,465 | B1 | 6/2002 | Peltz et al. |
| 6,419,462 | B1 | 7/2002 | Horie et al. |
| 6,422,016 | B2 | 7/2002 | Alkhamis |
| 6,453,659 | B1 * | 9/2002 | Van Liere et al. ............ 60/39.53 |
| 6,478,289 | B1 | 11/2002 | Trewin |
| 6,484,498 | B1 | 11/2002 | Bonar, II |
| 6,512,966 | B2 | 1/2003 | Lof |
| 6,513,326 | B1 | 2/2003 | Maceda et al. |
| 6,516,615 | B1 | 2/2003 | Stockhausen et al. |
| 6,516,616 | B2 | 2/2003 | Carver |
| 6,554,088 | B2 | 4/2003 | Severinsky et al. |
| 6,598,392 | B2 | 7/2003 | Majeres |
| 6,598,402 | B2 | 7/2003 | Kataoka et al. |
| 6,606,860 | B2 | 8/2003 | McFarland |
| 6,612,348 | B1 | 9/2003 | Wiley |
| 6,619,930 | B2 | 9/2003 | Jansen et al. |
| 6,626,212 | B2 | 9/2003 | Morioka et al. |
| 6,629,413 | B1 | 10/2003 | Wendt et al. |
| 6,637,185 | B2 | 10/2003 | Hatamiya et al. |
| 6,652,241 | B1 | 11/2003 | Alder |
| 6,652,243 | B2 | 11/2003 | Krasnov |
| 6,666,024 | B1 | 12/2003 | Moskal |
| 6,670,402 | B1 | 12/2003 | Lee et al. |
| 6,672,056 | B2 | 1/2004 | Roth et al. |
| 6,675,765 | B2 | 1/2004 | Endoh |
| 6,688,108 | B1 | 2/2004 | Van Liere |
| 6,698,472 | B2 | 3/2004 | Camacho et al. |
| 6,711,984 | B2 | 3/2004 | Tagge et al. |
| 6,712,166 | B2 | 3/2004 | Rush et al. |
| 6,715,514 | B2 | 4/2004 | Parker, III |
| 6,718,761 | B2 | 4/2004 | Merswolke et al. |
| 6,739,131 | B1 | 5/2004 | Kershaw |
| 6,739,419 | B2 | 5/2004 | Jain et al. |
| 6,745,569 | B2 | 6/2004 | Gerdes |
| 6,745,801 | B1 | 6/2004 | Cohen et al. |
| 6,748,737 | B2 | 6/2004 | Lafferty |
| 6,762,926 | B1 | 7/2004 | Shiue et al. |
| 6,786,245 | B1 | 9/2004 | Eichelberger |
| 6,789,387 | B2 | 9/2004 | Brinkman |
| 6,789,576 | B2 | 9/2004 | Umetsu et al. |
| 6,797,039 | B2 | 9/2004 | Spencer |
| 6,815,840 | B1 | 11/2004 | Aldendeshe |
| 6,817,185 | B2 | 11/2004 | Coney et al. |
| 6,834,737 | B2 | 12/2004 | Bloxham |
| 6,840,309 | B2 | 1/2005 | Wilson et al. |
| 6,848,259 | B2 | 2/2005 | Keller-sornig |
| 6,857,450 | B2 | 2/2005 | Rupp |
| 6,874,453 | B2 | 4/2005 | Coney et al. |
| 6,883,775 | B2 | 4/2005 | Coney et al. |
| 6,886,326 | B2 | 5/2005 | Holtzapple et al. |
| 6,892,802 | B2 | 5/2005 | Kelly et al. |
| 6,900,556 | B2 | 5/2005 | Provanzana |
| 6,922,991 | B2 | 8/2005 | Polcuch |
| 6,925,821 | B2 | 8/2005 | Sienel |
| 6,927,503 | B2 | 8/2005 | Enish et al. |
| 6,931,848 | B2 | 8/2005 | Maceda et al. |
| 6,935,096 | B2 | 8/2005 | Haiun |
| 6,938,415 | B2 | 9/2005 | Last |
| 6,938,654 | B2 | 9/2005 | Gershtein et al. |
| 6,946,017 | B2 | 9/2005 | Leppin et al. |
| 6,948,328 | B2 | 9/2005 | Kidwell |
| 6,952,058 | B2 | 10/2005 | Mccoin |
| 6,959,546 | B2 | 11/2005 | Corcoran |
| 6,963,802 | B2 | 11/2005 | Enis |
| 6,964,165 | B2 | 11/2005 | Uhl et al. |
| 6,964,176 | B2 | 11/2005 | Kidwell |
| 6,974,307 | B2 | 12/2005 | Antoune et al. |
| 7,000,389 | B2 | 2/2006 | Lewellin |
| 7,007,474 | B1 | 3/2006 | Ochs et al. |
| 7,017,690 | B2 | 3/2006 | Burke |
| 7,028,934 | B2 | 4/2006 | Burynski, Jr. |
| 7,040,083 | B2 | 5/2006 | Horii et al. |
| 7,040,108 | B1 | 5/2006 | Flammang |
| 7,040,859 | B2 | 5/2006 | Kane |
| 7,043,920 | B2 | 5/2006 | Viteri et al. |
| 7,047,744 | B1 | 5/2006 | Robertson et al. |
| 7,055,325 | B2 | 6/2006 | Wolken |
| 7,067,937 | B2 | 6/2006 | Enish et al. |
| 7,075,189 | B2 | 7/2006 | Heronemus |
| RE39,249 | E | 8/2006 | Link, Jr. |
| 7,084,520 | B2 | 8/2006 | Zambrano |
| 7,086,231 | B2 | 8/2006 | Pinkerton |
| 7,093,450 | B2 | 8/2006 | Jimenez Haertel et al. |
| 7,093,626 | B2 | 8/2006 | Li et al. |
| 7,098,552 | B2 | 8/2006 | Mccoin |
| 7,107,766 | B2 | 9/2006 | Zacche' et al. |
| 7,107,767 | B2 | 9/2006 | Frazer et al. |
| 7,116,006 | B2 | 10/2006 | Mccoin |
| 7,124,576 | B2 | 10/2006 | Cherney et al. |
| 7,124,586 | B2 | 10/2006 | Negre et al. |
| 7,127,895 | B2 | 10/2006 | Pinkerton et al. |
| 7,128,777 | B2 | 10/2006 | Spencer |
| 7,134,279 | B2 | 11/2006 | White |
| 7,155,912 | B2 | 1/2007 | Enis et al. |
| 7,168,928 | B1 | 1/2007 | West |
| 7,168,929 | B2 | 1/2007 | Sieqel et al. |
| 7,169,489 | B2 | 1/2007 | Redmond |
| 7,177,751 | B2 | 2/2007 | Froloff |
| 7,178,337 | B2 | 2/2007 | Pflanz |
| 7,191,603 | B2 | 3/2007 | Taube |
| 7,197,871 | B2 | 4/2007 | Yoshino |
| 7,201,095 | B2 | 4/2007 | Hughey |
| 7,218,009 | B2 | 5/2007 | Hendrickson et al. |
| 7,219,779 | B2 | 5/2007 | Bauer et al. |
| 7,225,762 | B2 | 6/2007 | Mahlanen |
| 7,228,690 | B2 | 6/2007 | Barker |
| 7,230,348 | B2 | 6/2007 | Poole |
| 7,231,998 | B1 | 6/2007 | Schechter |
| 7,240,812 | B2 | 7/2007 | Kamikozuru |
| 7,249,617 | B2 | 7/2007 | Musselman et al. |
| 7,254,944 | B1 | 8/2007 | Goetzinger et al. |
| 7,273,122 | B2 | 9/2007 | Rose |
| 7,281,371 | B1 | 10/2007 | Heidenreich |
| 7,308,361 | B2 | 12/2007 | Enis et al. |
| 7,317,261 | B2 | 1/2008 | Rolt |
| 7,322,377 | B2 | 1/2008 | Baltes |
| 7,325,401 | B1 | 2/2008 | Kesseli et al. |
| 7,328,575 | B2 | 2/2008 | Hedman |
| 7,329,099 | B2 | 2/2008 | Hartman |
| 7,347,049 | B2 | 3/2008 | Rajendran et al. |
| 7,353,786 | B2 | 4/2008 | Scuderi et al. |
| 7,353,845 | B2 | 4/2008 | Underwood et al. |
| 7,354,252 | B2 | 4/2008 | Baatrup et al. |
| 7,364,410 | B2 | 4/2008 | Link, Jr. |
| 7,392,871 | B2 | 7/2008 | Severinsky et al. |

| Patent/Pub No. | Date | Name |
|---|---|---|
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | Bollinger et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0218924 A1* | 10/2006 | Mitani .......................... 60/659 |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1* | 1/2009 | Stull et al. .......................... 290/44 |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |

| Publication No. | Date | Inventor |
|---|---|---|
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | Bollinger et al. |
| 2011/0296821 A1 | 12/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055146 A1 | 3/2012 | Baraga et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | McBride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047 622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |

| | | |
|---|---|---|
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO 0175290 | 10/2001 |
| WO | WO-0175308 A1 | 10/2001 |
| WO | WO-02/25083 | 3/2002 |
| WO | WO-02/46621 | 6/2002 |
| WO | WO-02/103200 | 12/2002 |
| WO | WO-03021107 A1 | 3/2003 |
| WO | WO-03021702 | 3/2003 |
| WO | WO-03/078812 | 9/2003 |
| WO | WO-03081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010040890 A1 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011079267 A1 | 6/2011 |
| WO | WO-2011079271 A2 | 6/2011 |

OTHER PUBLICATIONS

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

"Hydraulic Transformer Supplies Continuous High Pressure," Machine Design, Penton Media, vol. 64, No. 17, (Aug. 1992), 1 page.

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

\* cited by examiner

| Hole Diameter (um) | We$_{air}$ (at 20 bar) | Velocity (m/s) | Pressure Drop (bar) | # Holes per kW for 5°C change | Energy consumption (W) per kW for 5°C change |
|---|---|---|---|---|---|
| 100 | 40 | 35.2 | 17.0 | 175.1 | 82.3 |
| 300 | 40 | 20.3 | 5.7 | 33.7 | 27.4 |
| 500 | 40 | 15.7 | 3.4 | 19.7 | 16.5 |
| 700 | 40 | 13.3 | 2.4 | 9.5 | 11.8 |
| 900 | 40 | 11.7 | 1.9 | 6.5 | 9.1 |

FIG. 5 expansion). An isothermal process may be approximated via judicious selection of this heat-exchange rate.

However, compressed-gas-based systems may be simplified via thermal conditioning of the gas within the cylinder during compression and expansion, rather than via the above-described conditioning external to the cylinder. There is a need for such internal-conditioning systems that enable heat exchange with the gas in an efficient manner.

SUMMARY

In accordance with various embodiments of the present invention, droplets of a liquid (e.g., water) are sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder, as further detailed below. Droplets may be used to either warm gas undergoing expansion or to cool gas undergoing compression. An isothermal process may be approximated via judicious selection of this heat-exchange rate.

Specifically, embodiments of the invention relate to devices that form liquid sprays in a chamber containing either (i) low- to mid-pressure (e.g., up to 300 pounds per square inch gauge [psig]) gas, (ii) high-pressure (e.g., between 300 and 3,000 psig) gas, or (iii) both, to achieve significant heat transfer between the liquid and the gas. The heat transfer between the liquid and the air preferably enables substantially isothermal compression or expansion of the gas within the chamber. An exemplary device may include a plate or surface perforated at a number of points with orifices or nozzles to allow the passage of liquid from one side of the plate (herein termed the first side) to the other (herein termed the second side). A volume of liquid impinges on the first side of the plate: this liquid passes through the orifices or nozzles in the plate into a volume of gas that impinges on the second side of the plate and is at lower pressure than the liquid on the first side. The liquid exiting each nozzle into the gas may break up into droplets as determined by various factors, including but not limited to liquid viscosity, surface tension, pressure, density, and exit velocity; pressure and density of the gas; and nozzle geometry (e.g., nozzle shape and/or size). Herein, the term "nozzle" denotes any channel, orifice, or other device through which a liquid may be made to flow so as to produce a jet or spray at its output by encouraging the breakup of liquid flow into a spray of droplets.

Spray formation may occur via several mechanisms. Liquid (e.g., water) injected into gas at sufficient velocities will typically break up due to the density of the gas into which it is injected. However, it is generally desirable to minimize the injection velocity to minimize the energy needed to create the spray. Therefore, this type of breakup is especially pertinent at mid- to high-pressures where gas density is high, allowing for spray creation even with relatively low water-injection velocities. Thus even simple nozzles (e.g., channels with substantially parallel sides) which form a water jet at the nozzle exit will generally form a spray as gas density causes the water jet to break up into fine droplets.

In the low- to mid-pressure range, however, the air density is typically not great enough to cause the viscous drag needed to break a water jet up into a spray of small droplets. In this regime, water that exits a nozzle as a jet may remain in a solid jet and not form droplets. Thus, nozzles in accordance with embodiments of the invention may be more complex and incorporate mechanisms to break up water exiting the nozzle into droplets. For example, internal vanes may impart a rotational velocity component to the water as it exits the nozzle. This angular velocity causes the exiting water to diverge from the axis of the water spray, creating a cone of water droplets. Other nozzles may incorporate mechanisms such as corkscrews (i.e., spiral-shaped profiled surfaces) attached to and/or incorporated within the nozzles to break up the exiting water jet and form a cone of water droplets. These mechanisms enable atomized-spray formation for water injected even into low- to mid-pressure gas.

The spray device may include other features that enable it to function within a larger system. For example, a device may be installed within a vertically oriented pneumatic cylinder containing a mobile piston that divides the interior of the cylinder into two discrete chambers, this piston being connected to one or more shafts that transmit force between the piston and mechanical loads outside the cylinder. An above-described spray device, with all the features and components that it may include, is herein termed the "spray head."

A spray head may be affixed to the upper interior surface of a pneumatic cylinder or within a pneumatic chamber of another type of cylinder, e.g., a pneumatic/hydraulic cylinder. The spray head is generally perforated by one or more orifices having identical or various sizes, spacings, internal geometries, and cross-sectional forms, which produce droplet sprays within the gas-filled volume below the spray head. At the point of spray formation, droplets appear with velocity vectors scattered randomly over a certain solid angle ($\leq 2\pi$ steradians) centered on the vertical and pointing generally downward, forming a spray cone. At any pressure greater than zero and given a sufficiently large gas volume, the horizontal component of any particular droplet's momentum will eventually be dissipated by frictional interaction with the gas, after which the droplet will, in the ideal case, begin to fall vertically at a fixed terminal velocity. (The droplet may be perturbed from vertical fall by motions of the gas, such as those produced by convection or other turbulence.) For each droplet, both the limit of horizontal travel and the terminal velocity during vertical fall are determined largely by gas density and droplet size.

As a consequence of limited horizontal travel and vertical terminal velocity, the spray cone produced by each spray-producing nozzle will typically, at some distance beneath the nozzle, become a column of droplets falling at constant speed. Because the density of a gas at high pressure gas is higher than that of the same gas at low pressure (at a given temperature), the horizontal distance traveled by a droplet of a given size and initial velocity is smaller in high-pressure gas than in low-pressure gas. Likewise, the droplet's terminal velocity is lower in high-pressure gas. Therefore, in high-pressure gas, a column of droplets forming beneath a spray orifice tends to be narrower and slower-falling than a column that forms under the same orifice in low-pressure gas.

In order to maximize heat transfer between the droplets and the gas, embodiments of the invention preferably bring as much gas as possible into contact with as much droplet surface area as possible as the droplets fall through the gas. That is, the gas volume is generally filled or nearly filled with falling droplets. The spray cone or column of droplets produced by a single nozzle will not, in general, be wide enough to fill the gas volume. For mid- or high-pressure gas, the droplet column will generally be narrower, tending to require a larger number of orifices: in particular, the number of orifices required to fill or cover with spray a given volume of gas will be approximately proportional to the inverse of the square of the radius of the column. Thus, for example, halving spray-column radius while keeping the spray-head area constant will typically increase the number of orifices required by a factor of about four.

Alternatively, the initial velocity of spray droplets at each spray-head orifice, and consequently the width of the resulting spray column, may be increased by injecting liquid through the spray head at higher velocity. Injection of liquid at increased velocity requires increased difference between the pressure of the liquid on first side of the spray head and the pressure on the second side (this difference being termed $\Delta P$). Raising the liquid by larger $\Delta P$ would consume more energy. Higher-pressure injection will typically increase the distance at which a spray cone transitions into a column of falling droplets, therefore widening the column of spray droplets produced by each nozzle, but will typically also consume more energy and therefore will tend not to increase the energy efficiency of spray generation.

Moreover, if the gas volume has the form of a straight-sided torus due to the presence of a piston shaft within the cylinder, a single nozzle cannot in principle cover the whole interior volume with falling droplets due to the obstructive effect of the shaft.

Maximization of heat transfer with simultaneous minimization of energy consumed in generating the heat-transfer spray, therefore, generally requires multiple spray nozzles. Consequently, embodiments of the invention contain multiple spray nozzles and substantially cover the upper surface of the gas-filled chamber into which it injects spray. The spray-head surface may have an annular shape in embodiments where it surrounds a piston shaft, may be disc-shaped in embodiments where it is mounted on the end of a mobile piston, and may be otherwise shaped depending on a particular application.

Embodiments of the invention feature multiple simple or complex nozzles on the upper surface of a pneumatic chamber such that the spray cones or columns produced by these nozzles overlap and/or interact with each other, and thus leave minimal gas volume, if any, unfilled by spray. All or almost all of the gas volume is thus exposed to liquid spray as gravity pulls the columns of droplets downward from the spray head. In high-gas-pressure embodiments, where horizontal travel of spray droplets is small (e.g., due to high gas density), many close-spaced orifices may be utilized to fill all or nearly all of the gas volume with falling spray.

Generally, embodiments of the invention generate a considerably uniform spray within a pneumatic chamber and/or cylinder via at least one spray head with multiple nozzles, where the pressure drop across the spray-head orifices does not exceed 50 psi and the spray volumetric flow is sufficient to achieve heat exchange necessary to achieve substantially isothermal expansion or compression. In one embodiment, the heat exchange power per unit flow in kW per GPM (gallons per minute) per degree C. exceeds 0.10. The geometry of each nozzle may be selected to produce droplets having a diameter of about 0.2 mm to about 1.0 mm. Additionally, the plurality of orifices may be configured to maintain a pressure drop of the heat-transfer fluid at less than approximately 50 psi during introduction thereof and/or at least a portion of the plurality of orifices may have divergent cross-sectional profiles. In high-pressure-gas embodiments, the orifices may be configured and arranged in a manner to maintain a Weber value of the high-pressure gas sufficient to maintain the spray in a form comprising or consisting essentially of substantially individual droplets. In one embodiment, the orifices are configured to maintain the Weber value of the high-pressure gas at a value of at least 40.

Embodiments of the invention include features that enable efficient installation within a pneumatic chamber and/or cylinder, and may also include features that enable efficient provision of liquid from an exterior source to the interior of the device for transmission through the orifices in the plate.

Embodiments of the invention also increase the efficiency with which varying amounts of a heat-exchange liquid are sprayed into a pneumatic compressor-expander cylinder, thus minimizing the energy required to maintain substantially isothermal compression or expansion of a gas within the cylinder. Various embodiments of the invention enable the injection of heat-exchange liquid at two or more distinct rates of flow into one or both chambers of a pneumatic compressor-expander cylinder by equipping the spray mechanism within each chamber with two or more groups of spray-generating nozzles, where the flow of heat-exchange liquid through each nozzle group may be actuated independently. Recruitment of additional nozzle groups allows total flow rate to be increased by a given amount without increasing the power used to pump the liquid as much as would be required if the number of nozzles were fixed.

During expansion of gas from storage in certain systems such as those disclosed in the '207 patent and the '703 application, the pressure of a quantity of gas within one chamber of a pneumatic or pneumatic-hydraulic cylinder exerts a force upon a piston and attached rod slidably disposed within the cylinder. The force exerted by the gas upon the piston and rod causes the piston and rod to move. As described by the Ideal Gas Law, the temperature of the gas undergoing expansion tends to decrease. To control the temperature of the quantity of gas being expanded within the cylinder (e.g., to hold it constant, that is, to produce isothermal expansion), a heat-exchange liquid may be sprayed into the chamber containing the expanding gas. The spray may be generated by pumping the heat-exchange liquid through one or more nozzles, as detailed above. If the liquid is at a higher temperature than that of the gas in the chamber, then heat will flow from the droplets the gas in the chamber, warming the gas.

Similarly, when gas is compressed in the cylinder, as described by the Ideal Gas Law, the temperature of the gas undergoing compression tends to increase. Heat-exchange liquid may be sprayed into the chamber containing the gas undergoing compression. If the liquid is at a lower temperature than that of the gas in the chamber, then heat will flow from the gas in the chamber to the droplets, cooling the gas.

The maximum amount of heat Q to be added to or removed from the gas in a chamber of the cylinder by a given mass m of heat-exchange liquid spray is $Q=mc\Delta T$, where c is the specific heat of the liquid and $\Delta T$ is the difference between the initial temperature of the liquid and the final temperature of the liquid (i.e., temperature of the liquid when it has reached thermal equilibrium with the gas). Assuming that c and $\Delta T$ are fixed, the only way to alter Q is to alter m. In particular, to exchange more heat between the heat-exchange liquid and the gas in the cylinder chamber, m is increased.

The mass m of heat-exchange liquid entering the cylinder chamber in a given time interval is given by flow rate q and fluid density p. Here, m has units of kg, q has units of $m^3/s$, and p has units of $kg/m^3$. Thus, to add or remove more heat from the gas in the cylinder chamber for a heat-exchange liquid with near-constant density p, the flow rate q of the heat-exchange liquid is increased.

When liquid flows through a nozzle or orifice, it encounters resistance. This resistance is associated with a pressure drop Δp from the input side of the nozzle to the output side. The pressure drop across (i.e., through) the nozzle depends on the characteristics of a particular nozzle, including its shape, and on the flow rate q. In particular, to increase flow rate q, the pressure drop Δp is increased. The relationship between flow rate q and pressure drop Δp has the general form $q \propto p^n$; n is typically less than 0.50. (This may also be expressed as $p \propto q^{1/n}$) Moreover, the spraying power P consumed by forcing liquid at rate q through a nozzle with a constant pressure drop Δp is P=Δp q. Substituting $\Delta p \propto q^{1/n}$ for Δp in P=Δp q gives $P \propto q\ q^{1/n} = q^{1/n+1}$. If, for example, n=0.5, then $P \propto q^{1/n+1} = q^{1/0.5+1} = q^3$. Thus, the power required to achieve a given amount of flow through a single nozzle—and therefore through any fixed number of nozzles—increases geometrically with flow rate. As a consequence, doubling the flow rate more than doubles the required spraying power.

The rate of heat transfer between the gas in the pneumatic cylinder chamber and the heat-exchange liquid spray is proportional to the flow rate and bears a similar relation to spraying power as does the flow rate. Specifically, from Q=m c ΔT we have dQ/dt=p q c ΔT, where t is time, p is liquid density, q is liquid flow rate, ΔT is the difference between the initial temperature of the liquid and the final temperature of the liquid, and dQ/dt is rate of heat transfer. If p, c and ΔT are constant, $dQ/dt \propto q$. In the example where n=0.5, one has $P \propto q^3$, which combined with $dQ/dt \propto q$ gives $P \propto (dQ/dt)^3$. The spraying power P is thus, for an exemplary n of 0.5, proportional to the third power of the required rate of heat transfer. This result holds for any fixed number of nozzles.

For a required rate of spray heat transfer in a pneumatic cylinder, it is desirable to minimize the spraying power. Preferably, the spray power is minimized to just above the operating point (spray pressure) where a spray of sufficient quality continues to be generated at the output of each nozzle, since, as described above, the rate of heat transfer between the gas in the chamber and the heat-exchange liquid is greatly increased by mixing the heat-exchange liquid with the gas in the form of a spray, which maximizes the area of liquid-gas contact.

The flow rate (and thus rate of heat transfer if spray quality is maintained) may be increased with a less-than-geometric accompanying increase in spraying power by raising the number of active nozzles (i.e., nozzles through which heat-exchange liquid is made to flow) as the flow rate is increased. For example, the flow rate may be doubled by doubling the number of active identical nozzles without changing the flow rate through any individual nozzle. In this case, the spraying power P per nozzle remains unchanged while the number of nozzles doubles, so total spraying power doubles. In contrast, for a fixed number of identical nozzles, if an exemplary n of 0.5 is assumed, doubling the rate of heat transfer requires an eightfold increase in the spraying power P.

Thus, embodiments of the invention decrease the spraying power required while maintaining sufficient pressure drop in each nozzle (i.e., sufficient to create a spray at the output) by making the number of active nozzles proportional to the rate of flow. This proportionality may be exact or approximate.

Embodiments of the invention allow an increased flow rate of heat-exchange liquid through an arrangement of nozzles into a chamber of a pneumatic cylinder without geometric increase in spraying power. Various embodiments of the invention include methods for the introduction of heat-exchange liquid into a chamber of a pneumatic cylinder through a number of nozzles. One or more spray heads, rods, or other contrivances for situating nozzles within the chamber are equipped with two or more sets of nozzles. Each set of nozzles contains one or more nozzles. The sets of nozzles may be interspersed across the surface of the spray head, spray rod, or other contrivance, or they may be segregated from each other. The nozzles within the various sets may be of uniform type, or of various types. When a relatively low flow rate of heat-exchange liquid is desired, e.g. when the pressure of the gas within the chamber is relatively low, one or more nozzle sets may be employed to spray heat-exchange liquid into the chamber. At higher flow rates, e.g., when the pressure of the gas within the chamber is relatively high, two or more nozzle sets may be employed to spray heat-exchange liquid into the chamber. The identity and number of the nozzle sets employed to spray heat-exchange liquid at any given time may be determined by a control system, an operator, and/or an automatic arrangement of valves. When increased flow rate of heat-exchange liquid is desired in order to increase the rate of heat transfer, additional nozzle sets are activated.

In various embodiments of the invention, the heat-transfer fluid utilized to thermally condition gas within one or more cylinders incorporates one or more additives and/or solutes, as described in U.S. patent application Ser. No. 13/082,808, filed Apr. 8, 2011 (the '808 application), the entire disclosure of which is incorporated herein by reference. As described in the '808 application, the additives and/or solutes may reduce the surface tension of the heat-transfer fluid, reduce the solubility of gas into the heat-transfer fluid, and/or slow dissolution of gas into the heat-transfer fluid. They may also (i) retard or prevent corrosion, (ii) enhance lubricity, (iii) prevent formation of or kill microorganisms (such as bacteria), and/or (iv) include a defoaming agent, as desired for a particular system design or application.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be connected to either the environment or to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$ Any group of N cylinders staged in this manner, where $N \geq 2$, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

Embodiments of the invention may be implemented using any of the integrated heat-transfer systems and methods described in the '703 application and/or with the external heat-transfer systems and methods described in the '426 patent. In addition, the systems described herein, and/or other embodiments employing liquid-spray heat exchange or external gas heat exchange, may draw or deliver thermal energy via their heat-exchange mechanisms to external systems (not shown) for purposes of cogeneration, as described in U.S. patent application Ser. No. 12/690,513, filed Jan. 20, 2010 (the '513 application), the entire disclosure of which is incorporated by reference herein.

The compressed-air energy storage and recovery systems described herein are preferably "open-air" systems, i.e., systems that take in air from the ambient atmosphere for compression and vent air back to the ambient atmosphere after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. Selectively fluidly connected to the cylinder assembly are (i) a reservoir for storage of compressed gas after compression and supply of compressed gas for expansion thereof, and (ii) a vent for exhausting expanded gas to atmosphere after expansion and supply of gas for compression. The reservoir for storage of compressed gas may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a compressed-gas energy storage and recovery system including or consisting essentially of a cylinder assembly for compressing gas to store energy and/or expanding gas to recover energy, and a spray mechanism for introducing heat-transfer fluid within a chamber of the cylinder assembly to exchange heat with gas in the chamber, thereby increasing efficiency of the energy storage and recovery. The spray mechanism includes or consists essentially of a plurality of nozzles for collectively producing an aggregate spray filling substantially an entire volume of the chamber. The aggregate spray includes or consists essentially of a plurality of overlapping individual sprays each produced by one of the plurality of nozzles.

Embodiments of the invention may include one or more of the following, in any of a variety of combinations. Each individual spray may be an atomized spray of individual droplets. The individual droplets may have an average diameter ranging from approximately 0.2 mm to approximately 1 mm. The plurality of nozzles may maintain a Weber value of gas within the chamber of at least 40. Each nozzle may maintain a pressure drop across the nozzle of less than approximately 50 psi. At least one nozzle may have a divergent cross-sectional profile. At least one nozzle may include or consist essentially of a mechanism (e.g., a plurality of vanes and/or a corkscrew) for breaking of the flow of heat-transfer fluid through the nozzle. The system may include a control system for controlling the introduction of heat-transfer fluid into the chamber such that the compression and/or expansion of gas is substantially isothermal. The spray mechanism may occupy approximately the entire top surface of the chamber. The plurality of nozzles may be arranged in a triangular grid such that each nozzle having six nearest-neighbor nozzles is approximately equidistant from each of the six nearest-neighbor nozzles. The plurality of nozzles may be arranged in a plurality of concentric rings.

The system may include a movable boundary mechanism separating the cylinder assembly into two chambers and a rod coupled to the boundary mechanism and extending through at least one of the chambers. The spray mechanism may define a hole therethrough to snugly accommodate the rod. A crankshaft for converting reciprocal motion of the boundary mechanism into rotary motion may be mechanically coupled to the rod. A motor/generator may be coupled to the crankshaft. The spray mechanism may include a threaded connector for engaging a complementary threaded connector disposed within the cylinder assembly. The spray mechanism may include an interior channel (which may be toroidal) for transmitting heat-transfer fluid from a source external to the cylinder assembly to the plurality of nozzles. The system may include at least one o-ring groove configured to accommodate an o-ring for forming a liquid-impermeable seal between the spray mechanism and the interior surface of the chamber.

A compressed-gas reservoir for storage of gas after compression and supply of compressed gas for expansion thereof may be selectively fluidly connected to the cylinder assembly. A vent for exhausting expanded gas to atmosphere and supply of gas for compression thereof may be selectively fluidly connected to the cylinder assembly. An intermittent renewable energy source (e.g., of wind or solar energy) may be connected to the cylinder assembly. Energy stored during compression of gas may originate from the intermittent renewable energy source, and energy may be recovered via expansion of gas when the intermittent renewable energy source is nonfunctional.

The spray mechanism may include or consist essentially of a spray head or a spray rod. The system may include a circulation apparatus for circulating heat-transfer fluid to the spray mechanism and/or a heat exchanger for maintaining the heat-transfer fluid at a substantially constant temperature. The circulation apparatus may circulate heat-transfer fluid from the cylinder assembly through the heat exchanger and back to the cylinder assembly. The cylinder assembly may include or consist essentially of two separated chambers (e.g., a pneumatic chamber and a hydraulic chamber, or two pneumatic chambers). The system may include a heat-transfer fluid for introduction within the chamber. The heat-transfer fluid may include or consist essentially of water. The plurality of nozzles may be organized into at least two nozzle groups, at least one nozzle group not being active during a portion of a single cycle or compression or expansion.

In another aspect, embodiments of the invention feature a method for improving efficiency of compressed-gas energy storage and recovery. Gas is compressed to store energy and/or expanded to recover energy within a chamber of a cylinder assembly. During the compression and/or expansion, an entire volume of the chamber is substantially filled with an atomized spray of heat-transfer fluid to exchange heat between the gas and the atomized spray, thereby increasing efficiency of the energy storage and recovery. The atomized spray includes or consists essentially of a plurality of overlapping individual sprays each produced within the chamber.

Embodiments of the invention may include one or more of the following, in any of a variety of combinations. The heat exchange between the gas and the atomized spray may render the compression and/or expansion substantially isothermal. Expanded gas may be vented to atmosphere and/or compressed gas may be stored in a compressed-gas reservoir. Energy stored during compression of gas may originate from an intermittent renewable energy source (e.g., of wind or solar energy). Energy may be recovered via expansion of gas when the intermittent renewable energy source is nonfunctional. The individual sprays may be each produced by one of a plurality of nozzles organized into at least two nozzle groups. At least one nozzle group may not be active during a portion of a single cycle of compression or expansion.

In yet another aspect, embodiments of the invention feature a compressed-gas energy storage and recovery system including or consisting essentially of a cylinder assembly for compressing gas to store energy and/or expanding gas to recover energy, an actuating mechanism, and a heat-transfer mechanism for introducing heat-transfer fluid within a chamber of the cylinder assembly to exchange heat with gas in the chamber, thereby increasing efficiency of the energy storage and recovery. The heat-transfer mechanism includes or consists essentially of a plurality of nozzles. The actuating mechanism controls the number of active nozzles introducing heat-transfer fluid within the chamber during a single cycle of compression or expansion of gas.

Embodiments of the invention may include one or more of the following, in any of a variety of combinations. The actuating mechanism may include or consist essentially of at least one cracking-pressure valve. The actuating mechanism may include or consist essentially of a plurality of valves (e.g., each valve being associated with a nozzle) and a control system for controlling the valves based at least on a pressure within the cylinder assembly. The system may include a sensor for measuring the pressure within the cylinder assembly, and the control system may be responsive to the sensor. The control system may control the cylinder assembly and/or the heat-transfer mechanism to render the compression and/or expansion substantially isothermal. The plurality of nozzles may be substantially identical to each other. At least two nozzles may differ in at least one characteristic, e.g., type, size, and/or throughput. The heat-transfer mechanism may include or consist essentially of a spray head and/or a spray rod. The system may include a heat exchanger and a circulation apparatus for circulating heat-transfer fluid between the heat exchanger and the cylinder assembly. The plurality of nozzles may be organized into at least two nozzle groups, and at least one nozzle group may not be active during a portion of the single cycle of compression or expansion.

A compressed-gas reservoir for storage of gas after compression and supply of compressed gas for expansion thereof may be selectively fluidly connected to the cylinder assembly. A vent for exhausting expanded gas to atmosphere and supply of gas for compression thereof may be selectively fluidly connected to the cylinder assembly. An intermittent renewable energy source (e.g., of wind or solar energy) may be connected to the cylinder assembly. Energy stored during compression of gas may originate from the intermittent renewable energy source, and energy may be recovered via expansion of gas when the intermittent renewable energy source is nonfunctional.

The cylinder assembly may include or consist essentially of two separated chambers (e.g., a pneumatic chamber and a hydraulic chamber, or two pneumatic chambers). The system may include a movable boundary mechanism separating the cylinder assembly into two chambers. A crankshaft for converting reciprocal motion of the boundary mechanism into rotary motion may be mechanically coupled to the boundary mechanism. A motor/generator may be coupled to the crankshaft. The heat-transfer fluid may be introduced within the chamber in the form of an atomized spray filling substantially an entire volume of the chamber.

In another aspect, embodiments of the invention feature a method for improving efficiency of compressed-gas energy storage and recovery. Gas is compressed to store energy and/or expanded to recover energy within a chamber of a cylinder assembly. During the compression and/or expansion, heat-transfer fluid is introduced into the chamber through at least one of a plurality of nozzles to exchange heat with the gas, thereby increasing efficiency of the energy storage and recovery. The number of active nozzles introducing the heat-transfer fluid is based at least in part on a pressure of the gas in the chamber.

Embodiments of the invention may include one or more of the following, in any of a variety of combinations. The heat exchange between the heat-transfer fluid and the gas may render the compression and/or expansion substantially isothermal. Expanded gas may be vented to atmosphere, and/or compressed gas may be stored in a compressed-gas reservoir. Energy stored during compression of gas may originate from an intermittent renewable energy source (e.g., of wind or solar energy). Energy may be recovered via expansion of gas when the intermittent renewable energy source is nonfunctional. The heat-transfer fluid may be recirculated between the chamber and an external heat exchanger to maintain the heat-transfer fluid at a substantially constant temperature. During a first portion of a single cycle of expansion or compression at least one nozzle may not be active. During a second portion of the single cycle of expansion or compression different from the first portion, each of the nozzles may be active. The heat-transfer fluid may be introduced within the chamber in the form of an atomized spray filling substantially the entire volume of the chamber.

In yet another aspect, embodiments of the invention feature a method for energy storage and recovery. Gas is compressed within a chamber of a cylinder assembly to store energy. During the compression, heat-transfer fluid is introduced into the chamber at a rate that increases as the pressure of the gas increases. The heat-transfer fluid exchanges heat with the gas, thereby increasing efficiency of the energy storage.

Embodiments of the invention may include one or more of the following, in any of a variety of combinations. Introducing the heat-transfer fluid may include or consist essentially of increasing the spraying power of heat-transfer fluid at a less-than-geometric rate relative to the rate of introduction. The rate of introduction may be increased by increasing the number of active nozzles introducing the heat-transfer fluid into the chamber. The heat-transfer fluid may be recirculated between the chamber and a heat exchanger to maintain the heat-transfer fluid at a substantially constant temperature. The heat-exchange between the gas and the hear-transfer fluid renders the compression substantially isothermal.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. In the absence of a mechanical separation mechanism, a "chamber" or "compartment" of a cylinder may correspond to substantially the entire volume of the cylinder. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which:

FIG. 5 is a table showing variables associated with spray production for various orifice diameters and constant Weber number for air;

DETAILED DESCRIPTION

Figure 1:
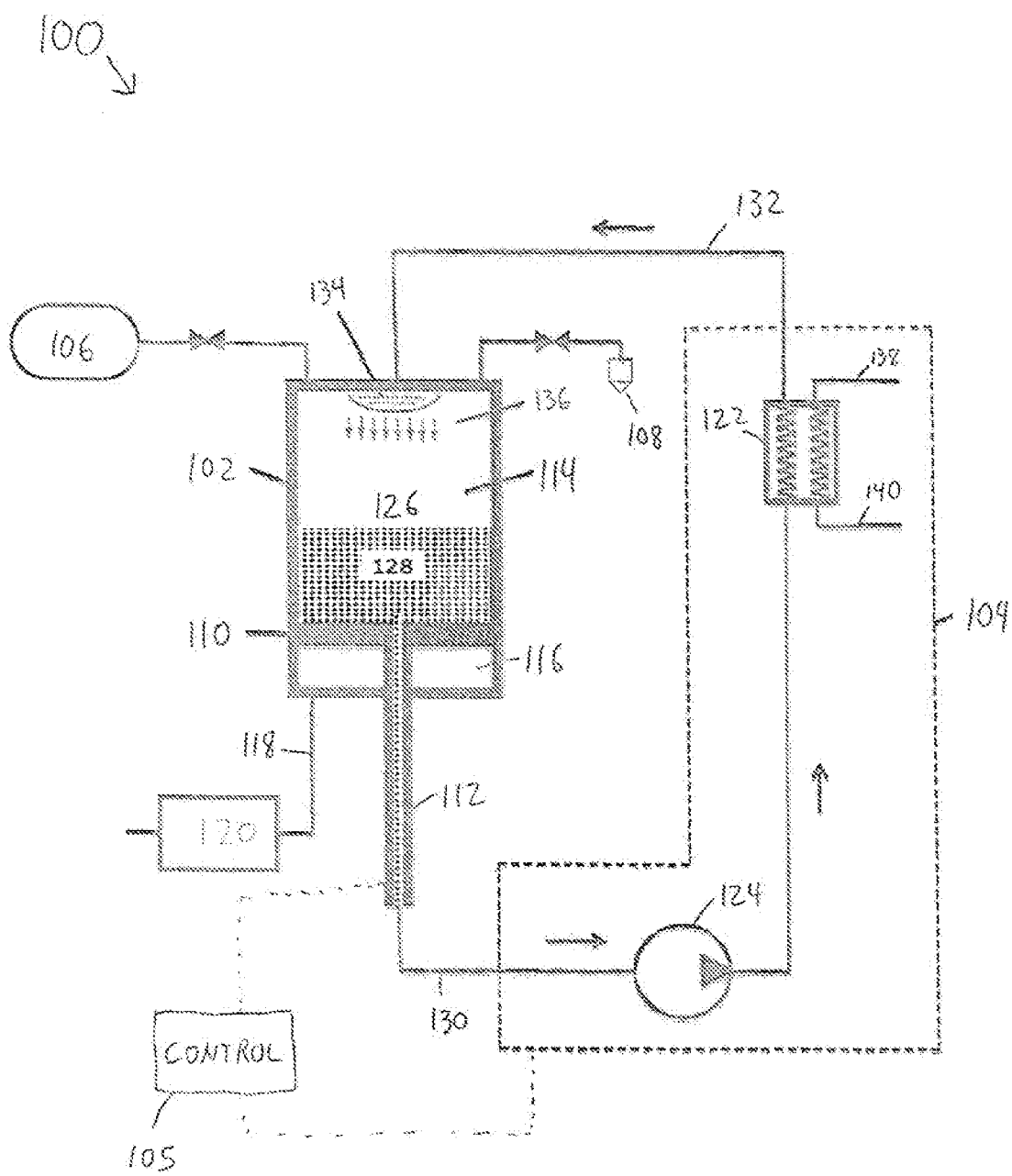
FIG. 1 is a schematic diagram of portions of a compressed-air energy storage and recovery system that may be utilized in conjunction with various embodiments of the invention.

FIG. 1 illustrates portions of a compressed air energy storage and recovery system 100 that may be utilized with embodiments of the present invention. The system 100 includes a cylinder assembly 102, a heat-transfer subsystem 104, and a control system 105 for controlling operation of the various components of system 100. During system operation, compressed air is either directed into vessel 106 (e.g., one or more pressure vessels or caverns) during storage of energy or released from vessel 106 during recovery of stored energy. Air is admitted to the system 100 through vent 108 during storage of energy, or exhausted from the system 100 through vent 108 during release of energy.

The control system 105 may be any acceptable control device with a human-machine interface. For example, the control system 105 may include a computer (for example a PC-type) that executes a stored control application in the form of a computer-readable software medium. More generally, control system 105 may be realized as software, hardware, or some combination thereof. For example, control system 105 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 105 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

The control system 105 may receive telemetry from sensors monitoring various aspects of the operation of system 100 (as described below), and may provide signals to control valve actuators, valves, motors, and other electromechanical/electronic devices. Control system 105 may communicate with such sensors and/or other components of system 100 via wired or wireless communication. An appropriate interface may be used to convert data from sensors into a form readable by the control system 105 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

The cylinder assembly 102 includes a piston 110 (or other suitable boundary mechanism) slidably disposed therein with a center-drilled rod 112 extending from piston 110 and preferably defining a fluid passageway. The piston 110 divides the cylinder assembly 102 into a first chamber (or "compartment") 114 and a second chamber 116. The rod 112 may be attached to a mechanical load, for example, a crankshaft or hydraulic system. Alternatively or in addition, the second chamber 116 may contain hydraulic fluid that is coupled through other pipes 118 and valves to a hydraulic system 120 (which may include, e.g., a hydraulic motor/pump and an electrical motor/generator). The heat-transfer subsystem 104 includes or consists essentially of a heat exchanger 122 and a booster-pump assembly 124.

At any time during an expansion or compression phase of gas within the first or upper chamber 114 of the cylinder assembly 102, the chamber 114 will typically contain a gas 126 (e.g., previously admitted from storage vessel 106 during the expansion phase or from vent 108 during the compression phase) and (e.g., an accumulation of) heat-transfer fluid 128 at substantially equal pressure $P_s$, (e.g., up to approximately 3,000 psig). The heat-transfer fluid 128 may be drawn through the center-drilled rod 112 and through a pipe 130 by the pump 124. The pump 124 raises the pressure of the heat-transfer fluid 128 to a pressure $P_i'$ (e.g., up to approximately 3,015 psig) somewhat higher than $P_s$, as described in U.S. patent application Ser. No. 13/009,409, filed on Jan. 19, 2011 (the '409 application), the entire disclosure of which is incorporated by reference herein. The heat-transfer fluid 128 is then sent through the heat exchanger 122, where its temperature is altered, and then through a pipe 132 to a spray mechanism 134 disposed within the cylinder assembly 102. In various embodiments, when the cylinder assembly 102 is operated as an expander, a spray 136 of the heat-transfer fluid 128 is introduced into the cylinder assembly 102 at a higher temperature than the gas 126 and, therefore, transfers thermal energy to the gas 126 and increases the amount of work done by the gas 126 on the piston 110 as the gas 126 expands. In an alternative mode of operation, when the cylinder assembly 102 is operated as a compressor, the heat-transfer fluid 128 is introduced at a lower temperature than the gas 126. Control system 105 may enforce substantially isothermal operation, i.e., expansion and/or compression of gas in cylinder assembly 102, via control over, e.g., the introduction of gas into and the exhausting of gas out of cylinder assembly 102, the rates of compression and/or expansion, and/or the operation of heat-transfer subsystem 104 in response to sensed conditions. For example, control system 105 may be responsive to one or more sensors disposed in or on cylinder assembly 102 for measuring the temperature of the gas and/or the heat-transfer fluid within cylinder assembly 102, responding to deviations in temperature by issuing control signals that operate one or more of the system components noted above to compensate, in real time, for the sensed temperature deviations. For example, in response to a temperature increase within cylinder assembly 102, control system 105 may issue commands to increase the flow rate of spray 136 of heat-transfer fluid 128.

The circulating system 124 described above will typically have higher efficiency than a system which pumps liquid from a low intake pressure (e.g., approximately 0 psig) to $P_i'$, as detailed in the '409 application.

Furthermore, embodiments of the invention may be applied to systems in which chamber 114 is in fluid communication with a pneumatic chamber of a second cylinder (rather than with vessel 106). That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 122 may be filled with water, a coolant mixture, and/or any acceptable heat-transfer medium. In alternative embodiments, a gas, such as air or refrigerant, is used as the heat-transfer medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 138 and fluid outlet 140 of the external heat exchange side of the heat exchanger 122 to an installation (not shown) such as a heat-engine power plant, an industrial process with waste heat, a heat pump, and/or a building needing space heating or cooling, as described in the '513 application. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-transfer fluid to acquire or expel heat from/to the linked process, depending on configuration, for later use as a heating/cooling medium in the compressed air energy storage/conversion system.

For the system 100 in FIG. 1, isothermal efficiency during gas expansion may be defined as the ratio of the actual work done on the piston to the theoretical work that could have been done on the piston if the gas expansion occurred perfectly isothermally. Total expansion efficiency may be defined as the ratio of the actual work done on the piston (less the expenditure of energy to produce the liquid spray) to the theoretical work that could have been done on the piston if the gas expansion occurred perfectly isothermally.

The efficiency of spray mechanisms such as spray mechanism 134 is increased in accordance with various embodiments of the present invention. Total expansion efficiency depends partly on (a) the behavior of the liquid injected into the gas and (b) the energy required to inject the liquid into the gas. Regarding the behavior of the liquid injected into the gas, the rate at which heat may be transferred to or from a given quantity of liquid to a given quantity of gas is generally proportional to the area of contact between the two (i.e., liquid surface area). When a given volume of liquid is reduced to N spherical droplets, the total surface area of the droplets is proportional to $N^{2/3}$. Atomization of the liquid during injection (i.e., large N, creation of a fine spray) is therefore generally conducive to more rapid heat transfer. For a given droplet residence time in the gas, more-rapid heat transfer also typically entails larger total heat transfer.

The energy required to inject the liquid into the gas is the energy required to force water through the spray mechanism 134. In general, for a given liquid flow rate (e.g., gallons per minute) through each orifice, larger orifices in the spray mechanism 134 will entail a smaller liquid pressure drop ($\Delta P$) from the interior of the spray mechanism 134 to the interior of chamber 114 and therefore less expenditure of energy ($E_i$) to inject a given volume ($V_T$) of heat-transfer liquid: $E_i = V_T \times \Delta P$.

However, in attempting to increase efficiency, the above considerations may be at odds. Higher injection velocity through an orifice of given size tends to result in a finer spray and more surface area (which pertains to consideration (a)) but also requires a larger $\Delta P$ and therefore a greater expenditure of energy (which pertains to consideration (b)). On the other hand, for a given rate of liquid flow per orifice, a larger orifice will entail a lower pressure drop $\Delta P$ and therefore lower injection energy $E_i$ per unit of heat-transfer liquid, but above a certain diameter a larger orifice will tend to produce a narrow jet rather than a fine spray. $E_i$ will thus be lower for a larger orifice (for a fixed flow rate), but so will droplet count N per unit of liquid volume, with a correspondingly lower rate of heat transfer. Therefore, to inject heat-exchange liquid in a manner that increases or maximizes total efficiency, it is necessary to consider in detail the behavior of a liquid injected into a gas, that is, liquid-phase dispersion (liquid breakup) in a liquid-gas system.

Figure 2:
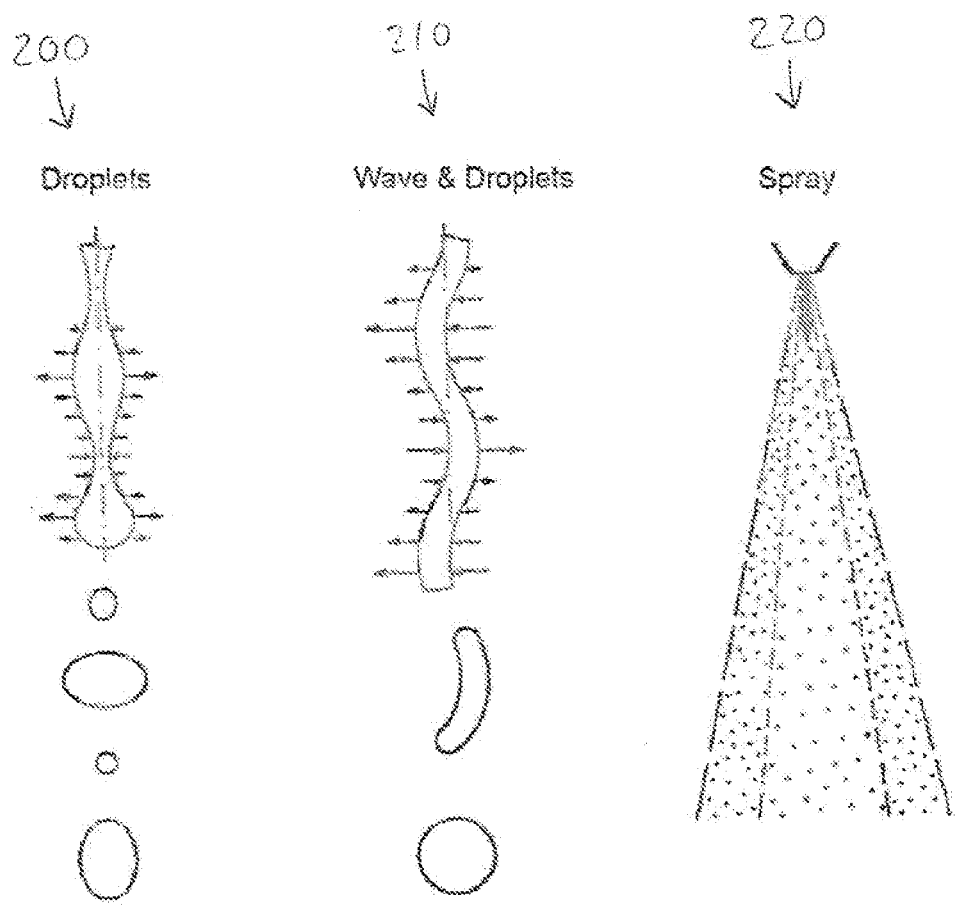
FIG. 2 is an illustration of three types of liquid-flow breakup.

FIG. 2 is an illustration of three types or regimes of liquid phase breakup. After exiting an orifice, a stream of liquid entering a volume of gas will eventually break up, forming drops. The location, form, number, and motions of the drops depend complexly on the character of the liquid flow through the orifice (e.g., velocity) and the physical properties (e.g., viscosity, density, surface tension) of both the liquid and the gas. For brevity, this discussion ignores the dripping regime, in which large droplets of approximately uniform size form at the orifice outlet.

Under conditions where a jet is produced at the orifice outlet, three basic types or regimes of liquid phase breakup and their relationship to liquid properties have been defined in W. Ohnesorge, "Formation of drops by nozzles and the breakup of liquid jets," *Zeitschrift für Angewandte Mathematik and Mechanik* [Applied Mathematics and Mechanics], vol. 16, pp. 355-358 (1936) (the "Ohnesorge reference"), the entire disclosure of which is incorporated by reference herein. In a first regime 200 shown in FIG. 2, a liquid jet eventually breaks up into large droplets. In a second regime 210, a jet breaks up into droplets and rapidly changing vermiform bodies termed ligaments. In a third regime 220, the liquid atomizes quickly after exiting the orifice, i.e., forms a spray consisting of a large number of small droplets.

Figure 3:
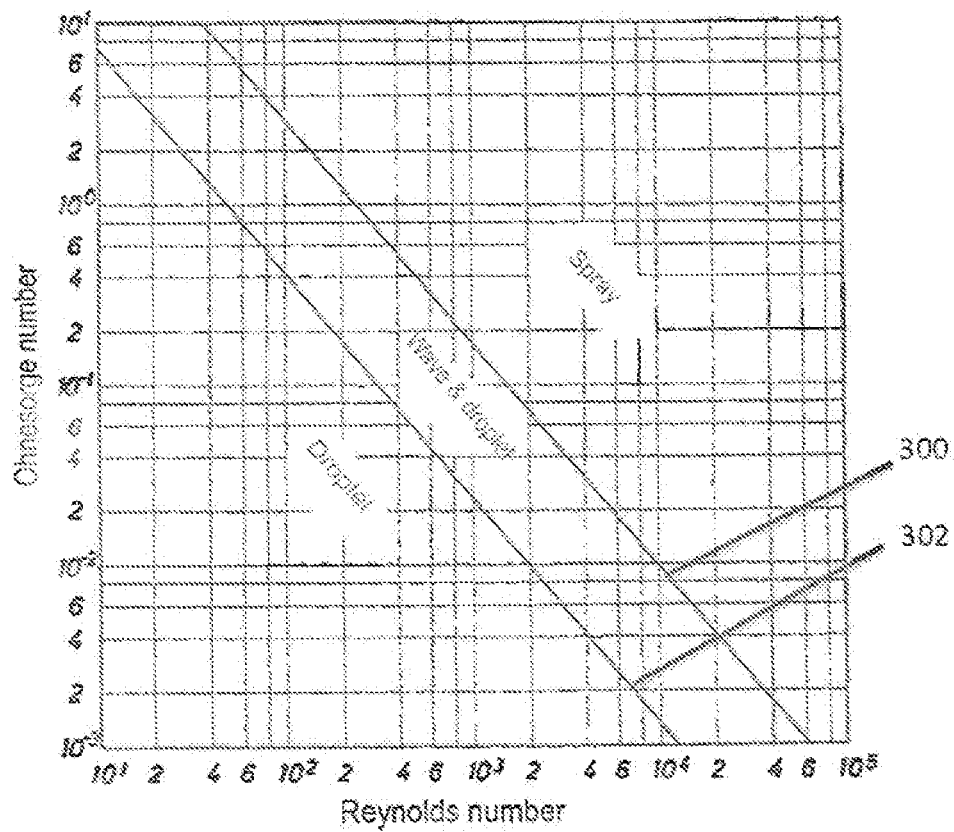
FIG. 3 is a chart showing the relationship of liquid-flow breakup to two dimensionless constants.

FIG. 3 is a chart adapted from the Ohnesorge reference. In this chart, the three breakup regimes (labeled Droplet, Wave & Droplet, and Spray) are shown as functions of two dimensionless numbers, namely the Reynolds number (horizontal axis) and the Ohnesorge number (vertical axis). The Reynolds numbers (Re) is a function of the liquid velocity at exit from the hole (v), hole diameter (D), liquid density ($\rho$), and liquid dynamic viscosity ($\mu$): $Re = \rho v D/\mu$. The Ohnesorge number (Oh) is a function of hole diameter (D), liquid density ($\rho$), liquid dynamic viscosity ($\mu$), and liquid surface tension ($\sigma$): $Oh = \mu/(\sigma \rho D)^{1/2}$. For a particular case of liquid flow from an orifice, the ratio of Re to Oh generally determines the type of breakup that will occur. For a liquid (e.g., water) having a fixed dynamic viscosity, density, and surface tension, a flow's Ohnesorge number (vertical coordinate on the chart) is determined by orifice diameter and its Reynolds number (horizontal coordinate) is determined by jet velocity. In FIG. 3, a line 300 denotes the transition from the Spray regime to the Wave & Droplet regime; another line 302 denotes the transition from the Wave & Droplet regime to the Droplet regime.

An operating point further to the right of line 300 in FIG. 3 will create a finer spray and therefore a greater total droplet surface area, which increases heat transfer, and tends to increase total expansion efficiency. However, because an operating point further to the right of line 300 requires a greater liquid velocity, it also requires a greater spray energy (energy required to generate the spray), which tends to decrease total system efficiency.

Figure 4:
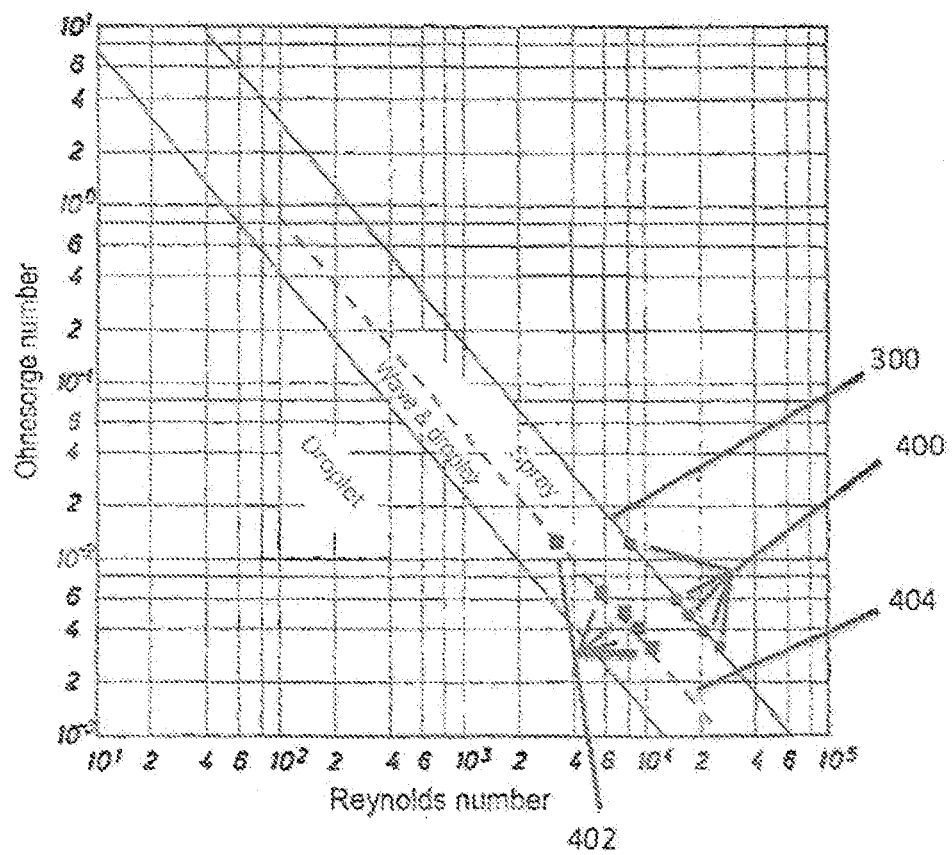
FIG. 4 is a chart showing the relationship of liquid-flow breakup to two dimensionless constants, with the effect of high air pressure indicated.
Figure 6:
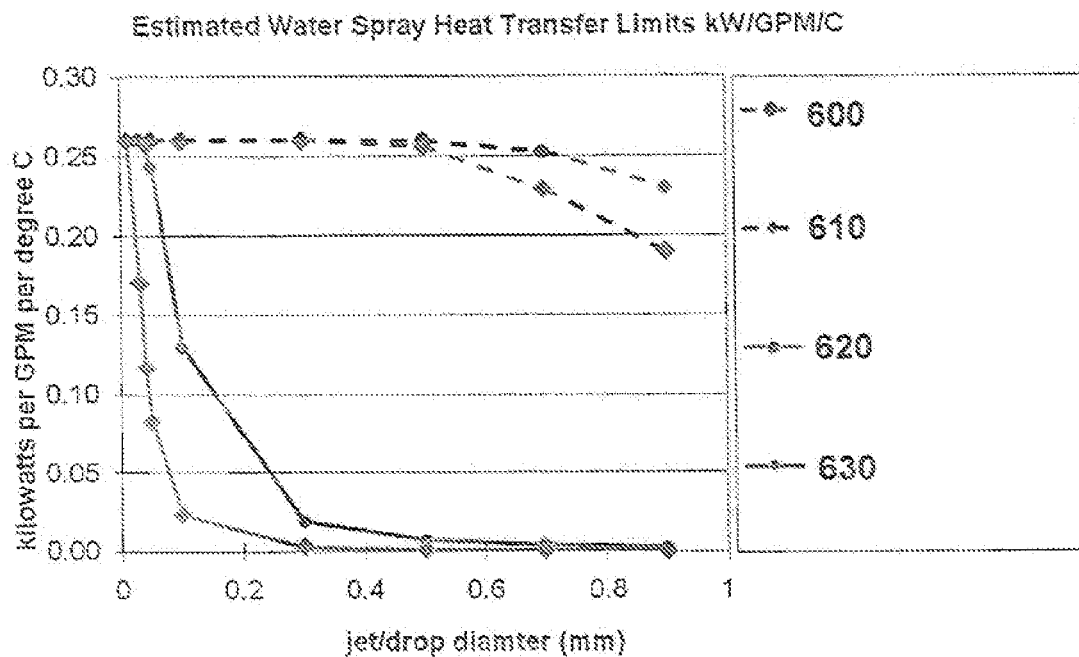
FIG. 6 is a plot of water-spray heat-transfer limits estimated mathematically.
Figure 7:
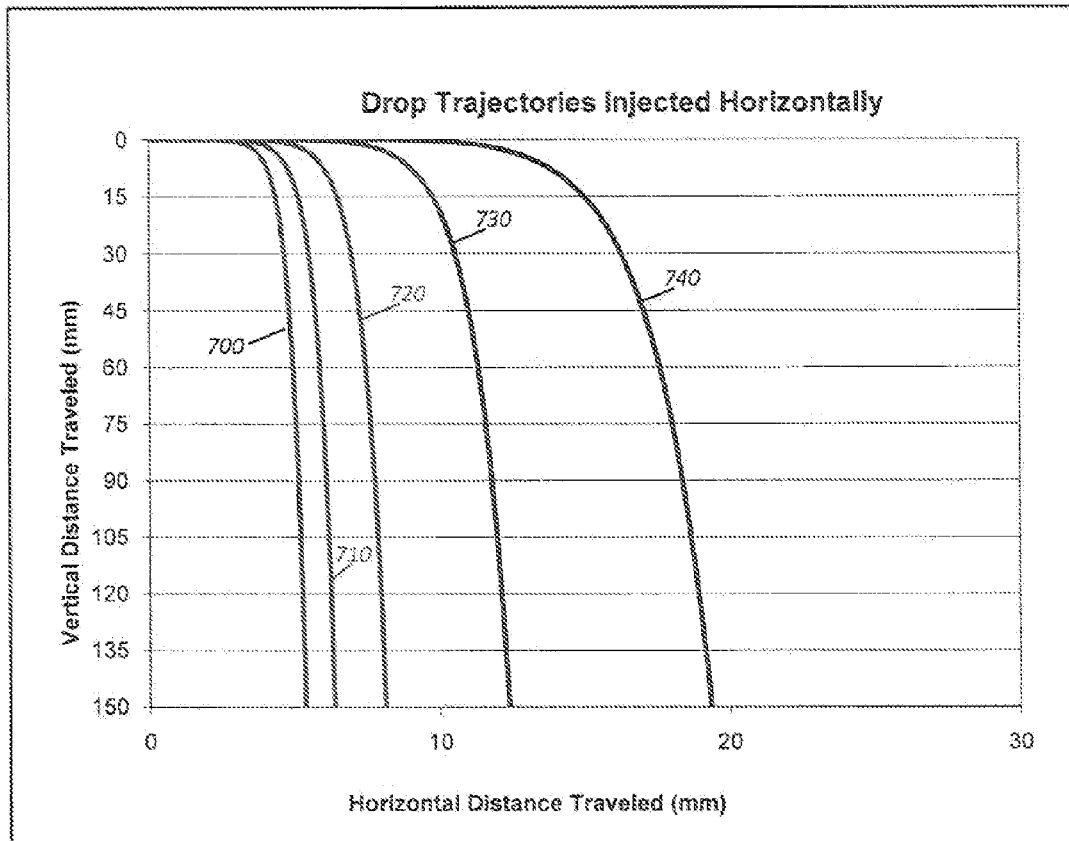
FIG. 7 is a plot of droplet trajectory lengths.

The chart shown in FIG. 3 is generally valid for liquid injection into gas at atmospheric pressure. At higher gas pressures, the aerodynamic forces acting on a jet of a given size are greater and atomization therefore occurs at lower velocities (lower Reynolds number, Re). FIG. 4 is a variation of the chart shown in FIG. 3 modified to reflect higher gas pressure. Five atomization operating points are denoted by dots 400 placed on the line 300 that in FIG. 3 corresponds to the boundary between spray (atomization) breakup and waveand-droplet breakup at atmospheric pressure. For an air pressure of approximately 3,000 psig, atomization tends to occur at lower jet velocities than at atmospheric pressure. Since Reynolds number Re is proportional to velocity, the boundary line between wave-and-droplet breakup and spray breakup is effectively shifted to the left (i.e., to lower Reynolds numbers) by increased air pressure. This shifted boundary is indicated by a dashed line 404. In this illustrative example, raising the air pressure to approximately 3,000 psig has the effect of shifting the five operating points 400 leftward to new locations 402 on the dashed boundary line 404. That is, all other parameters being held equal, a jet will typically atomize at lower velocity in approximately-3,000-psig air. Lower jet velocity corresponds to lower pressure drop ΔP through each spray-head orifice and, therefore, to lower injection energy $E_i$. Dashed boundary line 404 corresponds to Weber number for air (herein denoted $We_{air}$)≧40. The Weber number of air $We_{air}$ is a function of hole diameter (D), air density ($\rho_{air}$), liquid injection velocity (v), and liquid surface tension (σ): $We_{air}=\rho_{air}v^2D/\sigma$.

FIG. 5 is a table of projections of the energy required to produce an atomized spray by forcing fluid through a spray head assuming five different orifice diameters (100 μm, 300 μm, 500 μm, 700 μm, and 900 μm) calculated from the chart of FIG. 3 and taking into account the higher density of air at approximately 20 bar (an exemplary pressure into which an atomized spray may be injected in accordance with various embodiments of the invention). Given hole diameters of various sizes and the Weber number for air $We_{air}$≧40 selected for atomized spray formation, the required liquid orifice-exit velocity may be calculated and is provided in the third column of FIG. 5. Knowing the liquid orifice-exit velocity, the pressure drop across the orifice (i.e., from the first side of the spray head to the second side of the spray head) may be calculated and is provided in the fourth column of FIG. 5.

Furthermore, having specified the hole diameter and flow velocity in the first and third columns, and having knowledge of the specific heat of water, one may use the total flow per kW of per degree Celsius (heat-transfer coefficient) and an assumed temperature change of the injected fluid (here 5° C.) to calculate the number of orifices needed: this number is provided here in the fifth column of FIG. 5.

Finally, the energy consumed in forcing the heat-exchange liquid through the orifices may then be calculated from the pressure drop and flow rate (flow rate coming from the number of holes, velocity and area of the holes), and is provided in the sixth column. This figure is typically a minimum, as forcing the liquid through the orifices at still higher velocities will also produce atomized flows, albeit at higher energy cost.

FIG. 6 is a graph of calculated water spray heat-transfer rate limits for a range of water droplet sizes (25 μm-900 μm) for two extremes of water breakup behavior, namely solid jet and atomized spray, in air at 3,000 psig and at 300 psig. The horizontal axis is jet or droplet size. The vertical axis is kilowatts per GPM per degree C. change in the temperature of the injected water (kW/GPM/° C.). The upper curves 600, 610 denote kW/GPM/° C. for fully atomized injection (i.e., all injected water forms droplets falling at their terminal velocity) at 300 psig and 3,000 psig respectively, and correspond to highly efficient heat transfer. The lower curves 620, 630 denote kW/GPM/° C. for jet-only injection (i.e., no droplet breakup, and the jets propagating at 9.1 m/s injection velocity) at 300 psig and 3,000 psig respectively, and correspond to minimally efficient heat transfer. Due to non-idealities, real-world heat transfer will typically occur along some curve between these two sets of extremes.

From the values in the sixth column of FIG. 5, increasing orifice size tends to require less injection energy; however, from the drop-off of the upper curves 600, 610 in FIG. 6, maximal heat transfer (kW/GPM/° C.) tends to decline with increasing orifice size. Total efficiency therefore generally may not be increased simply by using very large orifice sizes. On the other hand, small orifices are more likely to be clogged by particles entrained in the liquid flow.

FIG. 7 is a plot of droplet trajectories for a horizontal injection velocity of 35.2 m/s and droplet diameter of 100 μm for injection into a range of gas pressures. Curves 700, 710, 720, 730, and 740 respectively correspond to pressures of 294 psig, 735 psig, 1470 psig, 2205 psig, and 2940 psig. FIG. 7 relates to another aspect of efficient heat-transfer using injected liquid sprays, namely volume coverage by individual sprays. At the point of spray formation outside an orifice, droplets of various sizes appear with velocity vectors scattered randomly over a certain solid angle (≦2π steradians) centered on the vertical. As a droplet travels through the gas its horizontal momentum is dissipated by interaction with the gas and it is accelerated vertically by gravity. After the horizontal component of a droplet's momentum has been dissipated, the droplet tends to fall vertically at a constant terminal velocity determined primarily by droplet size and gas density. FIG. 7 shows trajectories of droplets that receive a purely horizontal initial velocity of 35.2 m/s from an orifice. The horizontal momentum of a droplet is more quickly dissipated in a higher-pressure gas, which is relatively denser. This loss of horizontal droplet momentum in denser gas manifests in FIG. 7 as shorter horizontal distance traveled. Smaller droplets are generally superior for rapid heat transfer, both because a more finely atomized volume of heat-transfer liquid presents a larger liquid-gas surface area and because while falling they attain lower terminal velocities and thus dwell longer in the gas column. However, FIG. 7 illustrates the fact that smaller droplets (e.g., 100 μm) travel shorter horizontal distances in high-pressure gas. This constrains the width of the falling-droplet column that tends to form under each spray orifice and therefore increases the number of orifices required to fill a gas column of given horizontal cross-section with falling droplets.

In accordance with various embodiments of the invention, the geometry of each nozzle is selected to produce droplets having a diameter of about 0.2 mm to about 1.0 mm. Additionally, the nozzles may be configured to maintain a pressure drop of the heat-transfer fluid at less than approximately 50 psi during introduction thereof.

Droplets with smaller diameters will generally have lower terminal velocities than larger droplets. In higher-pressure air, droplet terminal velocities further decrease, so that drops having small diameters (e.g., less than 0.2 mm) may not reach all areas of a cylinder volume during a compression or expansion process. Additionally, nozzles configured to achieve even smaller average drop sizes than 0.2 mm (e.g., 0.05 mm) tend to require either substantially higher pressure drops or much smaller orifice sizes. Higher pressure drops require more pumping power, and larger quantities of smaller orifices may be more expensive and more prone to failure and clogging. Therefore, practicalities of droplet generation and distribution tend not to favor the generation of very small droplets, and optimal droplet size for a given cylinder assembly will be determined by a combination of factors. Among these factors, air pressures and piston speeds will tend to be more significant than cylinder diameter. For a liquid spray for isothermal-type compressed air systems as described herein, droplets having diameters of about 0.2 mm to about 1.0 mm both (a) effectively cover the volume of the cylinder chamber and (b) require relatively low pumping powers. For an exemplary system with two compression stages (e.g., the first stage compressing from 0 psig to 250 psig and the second stage compressing from 250 psig to 3000 psig), low-pressure cylinder diameters may be approximately 20 inches to approximately 50 inches (e.g., approximately 24 inches to approximately 42 inches) and high-pressure cylinder diameters may be approximately 6 inches to approximately 15 inches (e.g., approximately 8 inches to approximately 12 inches). Stroke lengths may be approximately 20 inches to approximately 80 inches (e.g., approximately 30 inches to approximately 60 inches). Peak piston speeds may be between 3 and 15 feet per second. In various embodiments, any of the above-described cylinders are utilized singly or in systems featuring two or more cylinders (that are identical to or different from each other).

Figure 8:
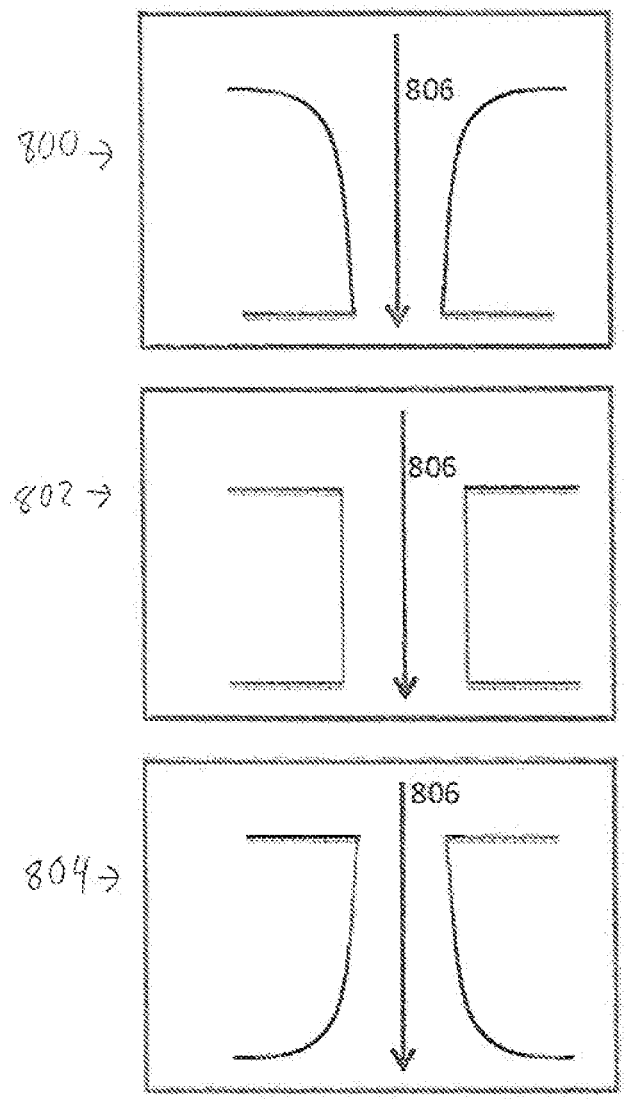
FIG. 8 shows three types of orifice cross-section in accordance with various embodiments of the invention.

FIG. 8 pertains to another aspect of efficient heat-transfer using liquid sprays injected into gas, namely the effect of spray-head channel geometry on spray generation. FIG. 8 shows three possible types of spray-channel cross-sections, namely convergent profile 800, parallel profile 802, and divergent profile 804. The material of the plate through which the channels pass may be metal, ceramic, or any other rigid substance of sufficient strength. Liquid flow through each channel is indicated by arrows 806. The space above the plate through which the channels pass is presumed to be filled with liquid and the space below the plate is presumed to be filled primarily with gas. All three channel types shown in FIG. 8 may be readily manufactured using known techniques, such as mechanical drilling and laser drilling. Channel cross-section affects the mode of liquid flow through the channel and, consequently, the mode of jet or spray formation at the outlet of the channel (i.e., at the spray orifice). Our experimental work shows that for simple nozzles the divergent channel type 804 produces an atomized, well-dispersed spray with the least energy expenditure at a given gas pressure. Spray energy may also be reduced by use of more complex nozzle designs such as axial full-cone spray nozzles with internal vanes, large free-passage helical nozzles, and angled vaneless spray nozzles, all of which are available commercially from companies such as Spraying Systems Corporation in Wheaton, Ill.

Figure 9:
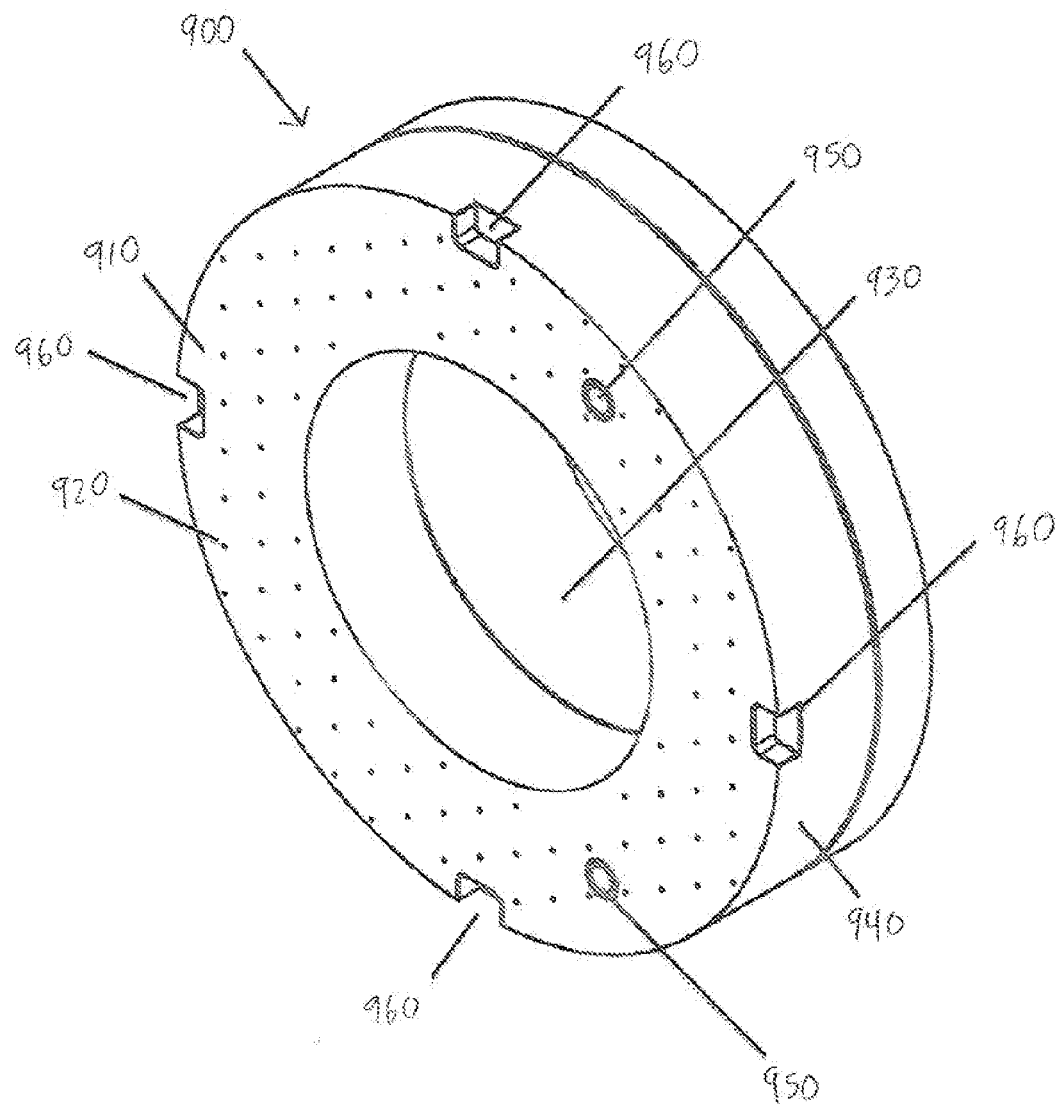
FIG. 9 is an isometric view of a spray head in accordance with various embodiments of the invention.

FIG. 9 is an isometric view of an illustrative embodiment of the invention in the form of a spray head 900 configured for mounting within, e.g., a vertically-oriented pneumatic cylinder having a cylindrical interior cross section. As shown, the spray head 900 has the form of a round, straight-sided torus approximately 18 cm in exterior diameter, although other shapes (e.g., disc, square) and dimensions are within the scope of the invention. The faceplate 910 of the spray head 900 is perforated by a number of orifices 920 that are each approximately 900 μm in diameter. The orifices 920 are arranged in a triangular grid so that, in the ideal or infinitely extended grid, each orifice 920 is approximately 1 cm from each of its six nearest neighbors (where each orifice and its six nearest neighbors collectively define a hexagon centered on the orifice and having approximately equal sides). Other arrangements of orifices 920 may be employed in accordance with embodiments of the invention. For example, concentric rings of orifices 920 may be centered on a central opening 930 of the spray head 900.

The spray head 900 may be mounted horizontally within a vertically-oriented cylinder with its faceplate 910 facing downward at the top of a gas-filled chamber within the cylinder (for example, in cylinder assembly 102). A piston shaft typically passes snugly through the circular central opening 930 of the spray head 900 and the lateral surface 940 of the spray head 900 is typically in snug contact with the cylindrical inner wall of the cylinder. The open horizontal area at the top of the cylinder chamber may be wholly occupied by the faceplate 910 of the spray head 900. Each orifice 920 communicates with the upper side of the faceplate 910 through a channel that may be convergent, straight-sided, or divergent, as shown in FIG. 8, or which may have some other configuration (and/or may incorporate mechanisms such as vanes inside, as described above).

The spray head 900 is primarily affixed to the cylinder by means of a threaded protruding collar (1200 in FIGS. 12 and 13) on its upper side. To prevent the threaded collar from backing out during operation, two set-screws (or some other suitable number of set-screws) may be inserted through the spray head 900 through openings 950. Since the spray head 900 preferably fits snugly into the cylinder and around a central piston rod, provision is generally made for applying torque to the spray head 900 in order to screw its threaded collar (1200 in FIGS. 12, 13) into a matching thread in the upper end of the cylinder. Four notches 960 (or some other suitable number of notches 960) may be provided to enable a tool to apply torque to the spray head 900 during installation; however, other methods of securing the spray head within the cylinder are contemplated and considered within the scope of the invention.

Heat-exchange liquid is conveyed to the channels of the orifices 920 through an arrangement of channels or hollows in the body of the spray head (see FIGS. 13 and 14) from a source exterior to the cylinder. Heat-exchange liquid issues from the orifices 920 into the gas-filled chamber of the cylinder. If injection pressure is sufficient, the liquid will form an atomized spray upon exiting each orifice. In an illustrative embodiment of the invention, injection pressure drop from the interior of the spray head 900 to the exterior is in the range of approximately 30 psi to approximately 70 psi, for example approximately 50 psi. This illustrative embodiment will efficiently produce a spray effective for purposes of heat transfer during injection into gas over the approximate pressure range of 3,000 psi to 300 psi (e.g., during expansion to 300 psi of a quantity of gas starting at 3,000 psi or during compression to 3,000 psi of a quantity of gas starting at 300 psi).

Figure 10:
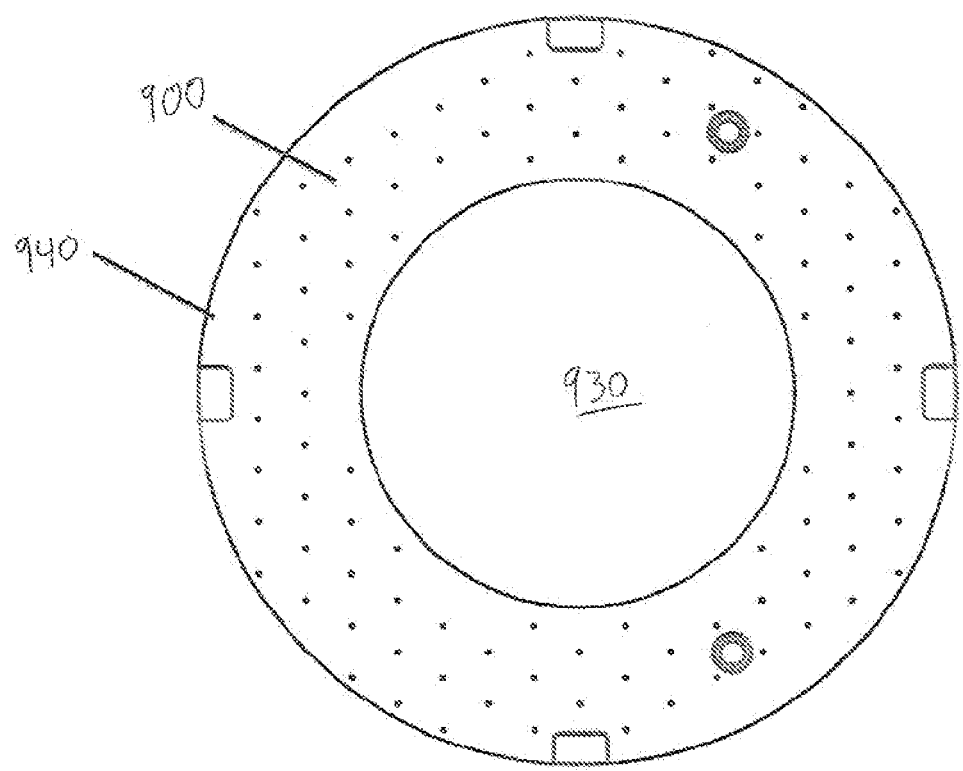
FIG. 10 is a plan view of the spray head of FIG. 9.

FIG. 10 is a plan view of the lower surface of spray head 900. When the spray head 900 is installed, the hole 930 is typically filled with the cylinder piston rod and the lateral surface 940 of the spray head 900 is in contact with the interior wall of the cylinder. In this view, in one state of operation, liquid spray is directed out of the page.

Figure 11:
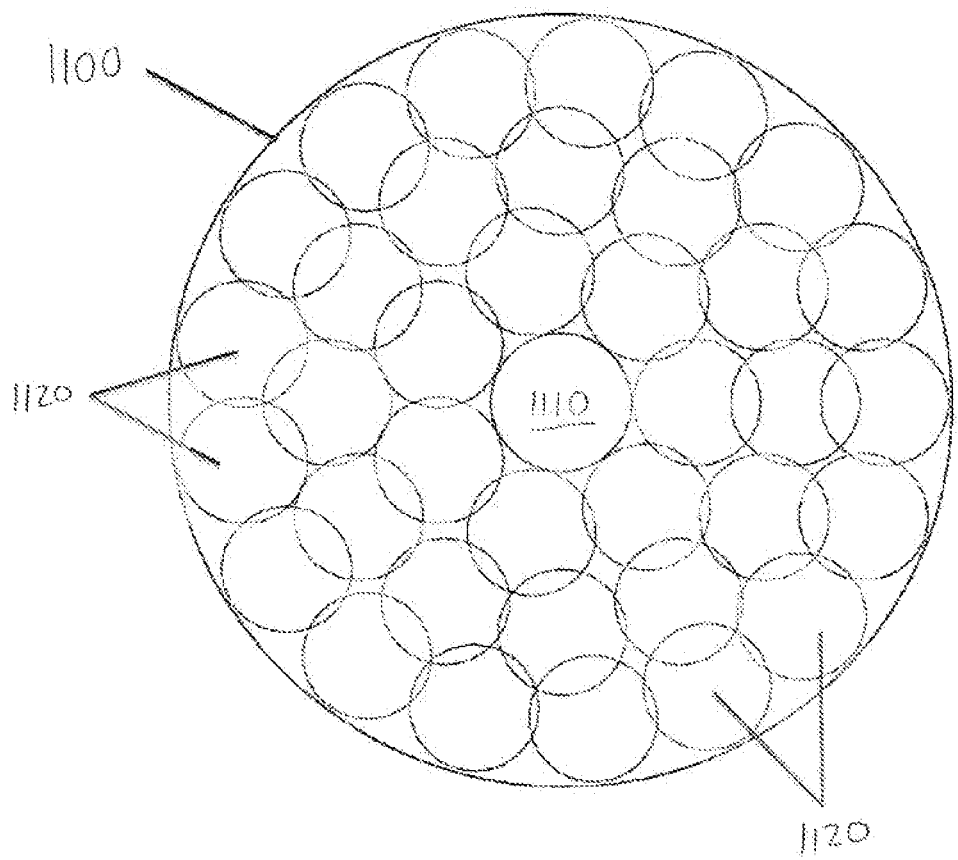
FIG. 11 is a schematic view of spray coverage from a spray head in accordance with various embodiments of the invention.

FIG. 11 is a schematic view of spray coverage from a spray head 1100 resembling spray head 900 but having a smaller central hole 1110 and fewer orifices (not explicitly shown). Due to air resistance, the spray droplets from each spray-head orifice travel a limited horizontal distance before beginning to fall approximately vertically (i.e., out of the page) at their terminal velocity. Each orifice therefore tends to produce a column of vertically falling droplets centered under it. The approximate cross-sectional widths and locations of a number of such columns are shown in FIG. 11 by circles 1120. In various preferred embodiments of the invention, the orifices are spaced so that when liquid is being injected into high-pressure gas at an appropriate injection pressure, the columns of falling spray overlap or interact with each other, entirely or almost entirely filling the column of gas contained within the chamber of the cylinder and maximizing the rate of liquid-gas heat transfer. In a preferred embodiment, droplets of liquid fill or rain through substantially the entire gas volume of the chamber of the cylinder, e.g., with only a few (for example, 1 to 5) droplet diameters of gas-filled space between any two falling drops. In this preferred embodiment, a minimal amount of fluid runs down the sides of the cylinder body (e.g., after droplets impact the sides of the cylinder body), and the majority of the fluid is raining through the gas.

Figure 12:
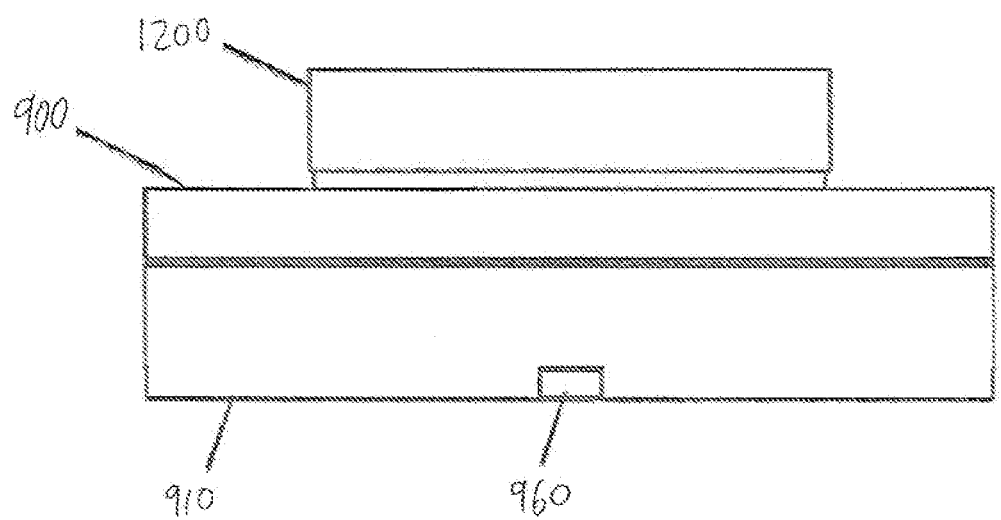
FIG. 12 is a side view of the spray head of FIG. 9.

FIG. 12 is a side view of the spray head 900. The lower surface of the faceplate 910 of the spray head 900 is shown edge-on. One notch 960 for the torque-applying insertion tool described above is visible. As previously described, the spray head 900 includes a protruding threaded collar 1200. The outer lateral face of the collar 1200 is preferably threaded (threads not shown) and screws into a complementary threaded opening disposed in the top of the cylinder.

Figure 13:
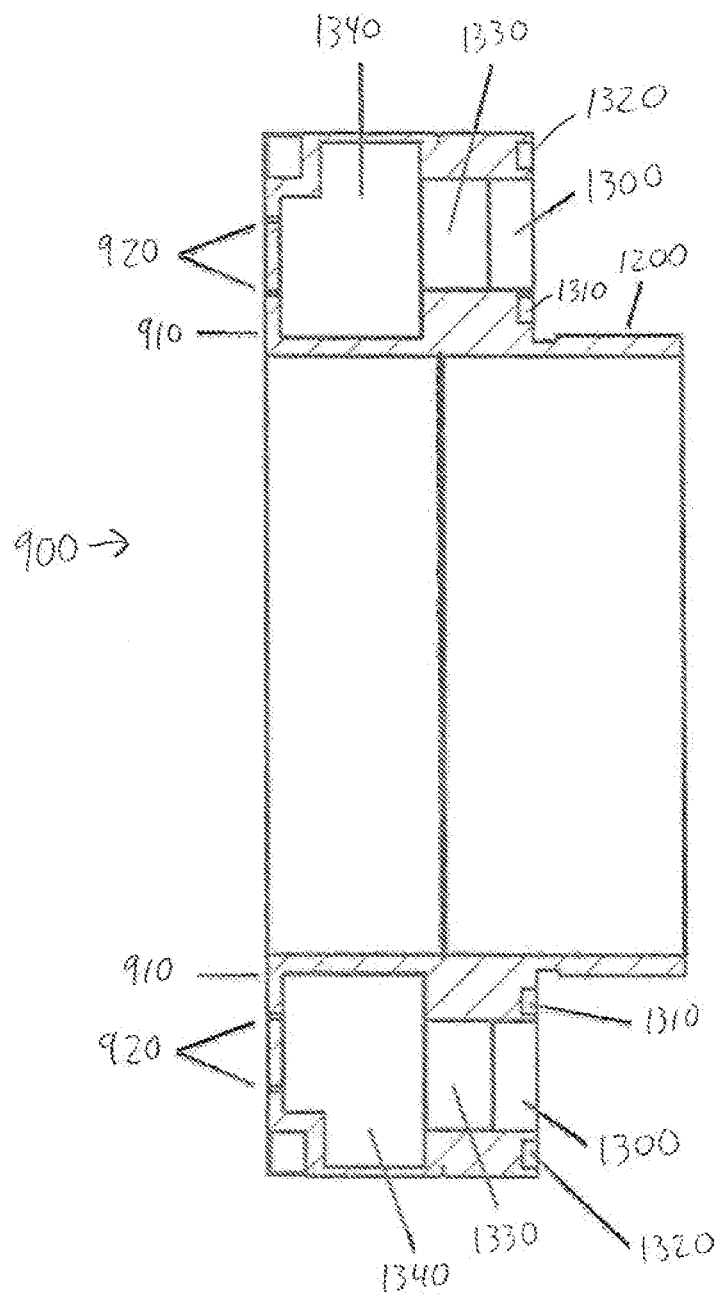
FIG. 13 is an axial cross-section of the spray head of FIG. 9.

FIG. 13 is an axial cross section of the spray head 900, in which the faceplate 910 of the spray head 900 is shown edge-on. A toroidal or ring-shaped channel 1300 (visible in cross-section in FIG. 13) is disposed in the upper surface of the spray head 900 and, during operation of the spray head 900, is partially or substantially filled with a pressurized liquid from an exterior source admitted through inlets in the upper end of the cylinder (not shown). When the spray head 900 is screwed into position, o-rings within o-ring grooves 1310, 1320 seal the spray head 900 against the inside of the cylinder and prevent fluid within channel 1300 from exiting around the o-ring grooves 1310, 1320 into the cylinder.

Six holes 1330 (two of which are visible in cross-section in FIG. 13 and all of which are visible end-on in FIG. 14) pass through the floor of channel 1300 to a second ring-shaped channel 1340 within the spray head 900. This interior channel 1340 conducts liquid to the faceplate 910 and spray orifices 920. When the spray head 900 is screwed into position, there may be no precise control over its final angular orientation, but the upper-surface channel 1300, holes 1330, and interior channel 1340 ensure that, regardless of the orientation of the fully installed spray head 900 with respect to the liquid inlets in the upper end of the cylinder, liquid may flow unimpeded to the spray orifices 920.

Figure 14:
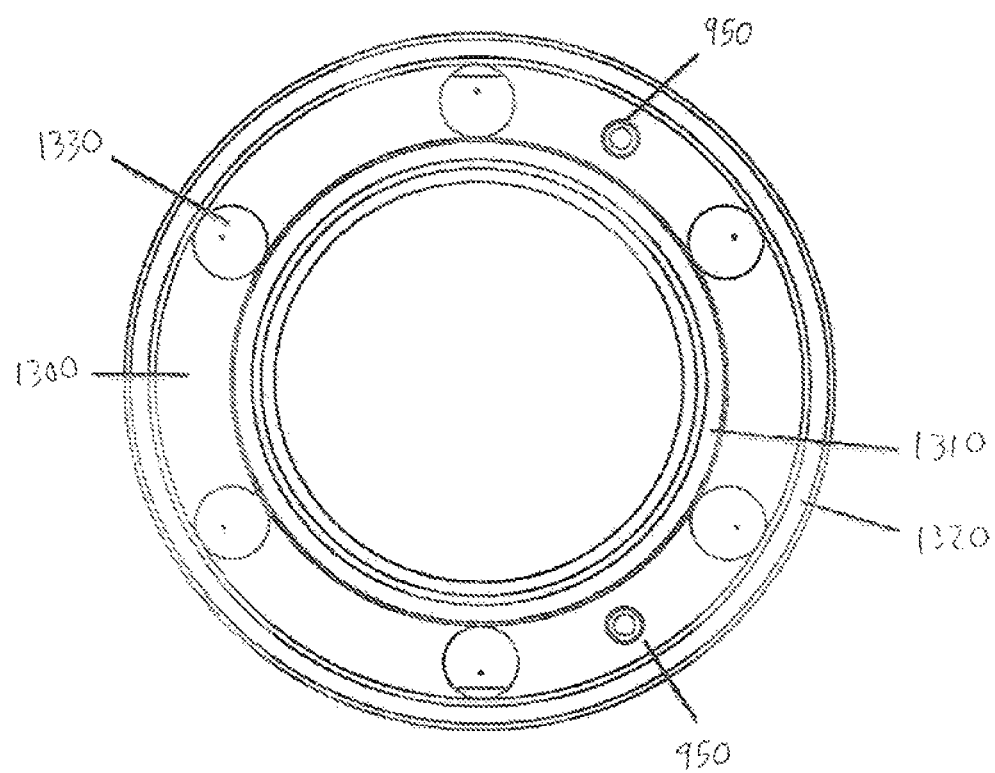
FIG. 14 is top-down view of the spray head of FIG. 9.

FIG. 14 is a top-down view of the spray head 900, in which the upper ring-shaped channel 1300 is fully visible, as are the six holes 1330 that communicate with the inner ring-shaped channel 1340 (FIG. 13). As shown, six holes 1330 are arranged at equal distances apart about the inner ring-shaped channel; however, any number and arrangement of holes 1330 may be used to suit a particular application. The two set-screw clearance holes 950 are also visible.

Figure 15:
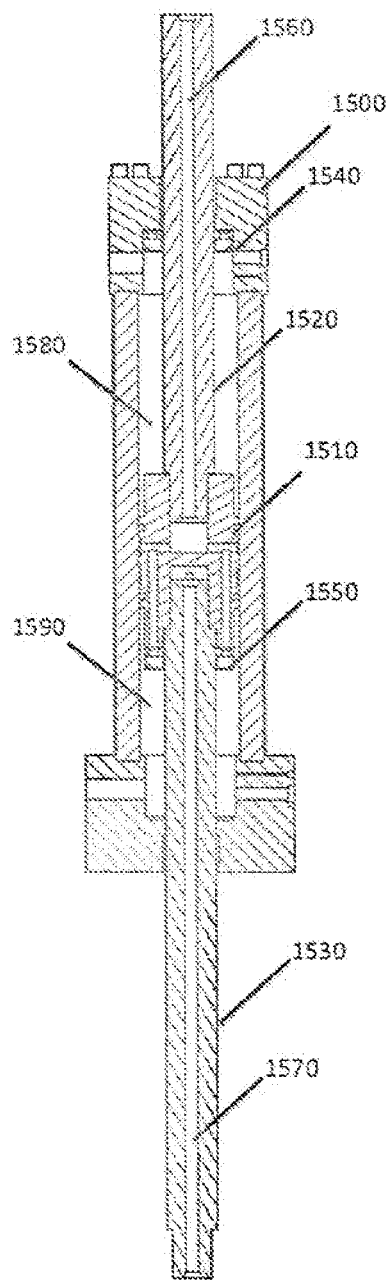
FIG. 15 is an axial cross section of a double-acting pneumatic cylinder incorporating two of the spray heads shown in FIG. 9.

FIG. 15 is a cross-sectional side view of one illustrative embodiment of the invention utilizing a spray head as described herein. A high-pressure cylinder 1500 contains a piston 1510 that is attached to two shafts 1520, 1530 that pass through opposite ends of the cylinder 1500. One spray head 1540 of the design described with respect to FIG. 9 is mounted in the upper end of the cylinder 1500. A second spray head 1550 of the design described with respect to FIG. 9 is mounted on the lower surface of the piston 1510. Liquid is conveyed to the upper spray head 1540 directly through the upper end of the cylinder. A center-drilled channel 1560 within shaft 1520 enables water (or another suitable heat-exchange fluid) to be conveyed to the spray head 1550 mounted on the piston 1510 so as to introduce a liquid spray into the lower chamber 1590. A center-drilled channel 1570 within shaft 1530 enables water to be conveyed out of the upper chamber 1580 of the cylinder 1500. A system of channels for introduction of liquid to and removal of liquid from the chambers of a pneumatic cylinder as described in the '513 application may be utilized with various embodiments of the invention.

In the illustrative embodiment shown in FIG. 15, the cylinder 1500 may compress or expand gas in either chamber and is, therefore, double-acting. For example, if the cylinder 1500 is being used to extract mechanical work from the expansion of a gas in the upper chamber 1580, the upper spray head 1540 may be used to perform liquid-gas heat exchange during the expansion, during which the piston 1510 moves downward. Similarly, the lower spray head 1550 may be used during the expansion of a gas in the lower chamber 1590, during which the piston 1510 moves upward. Whatever mode of operation is chosen, atomized sprays from the orifices of the active spray head 1540, 1550 form vertical, interacting (and/or overlapping) cylinders of falling droplets that exchange heat with substantially all of the interior of the chamber 1580, 1590 being injected with liquid. In other applications, both spray heads 1540, 1550 are employed simultaneously.

Figure 16:
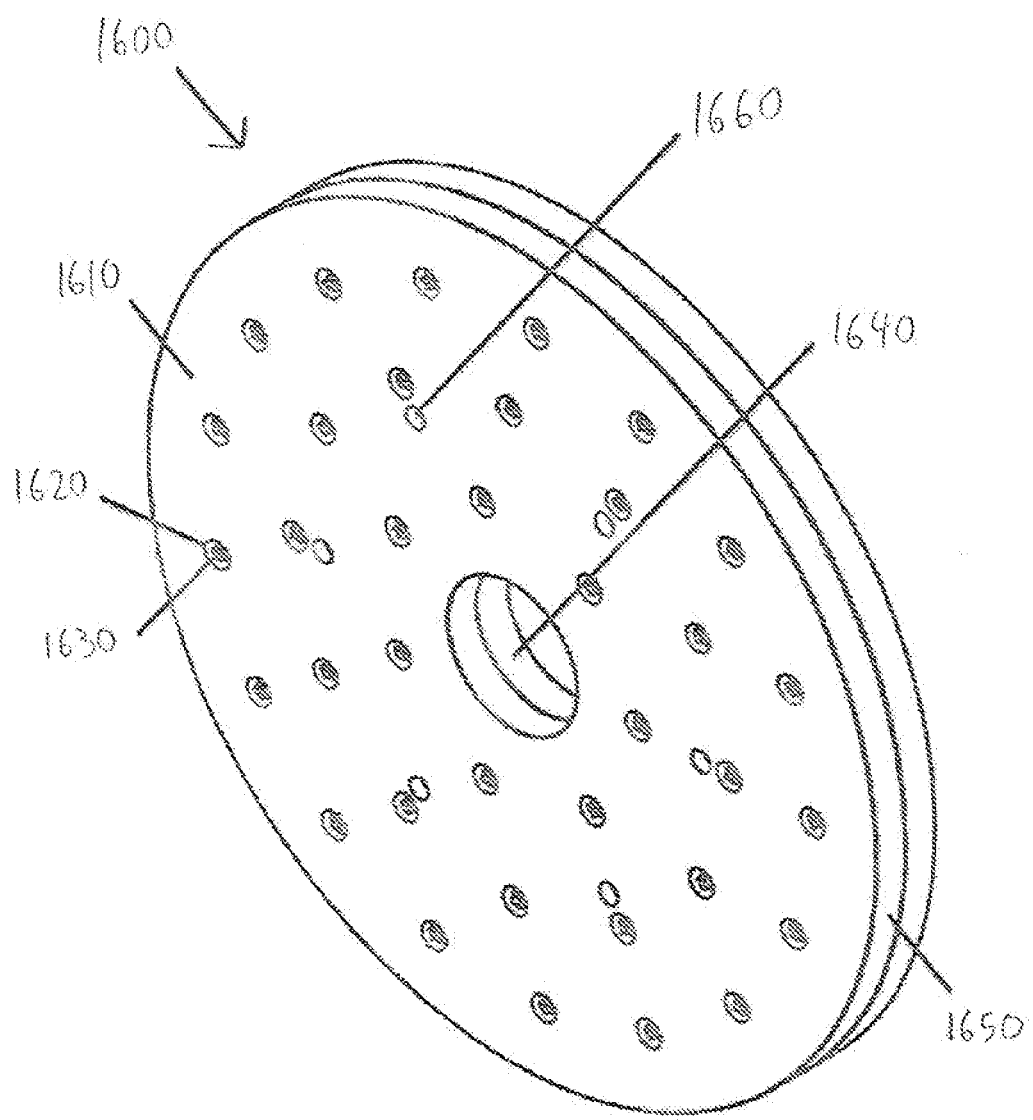
FIG. 16 is an isometric view of a spray head in accordance with various other embodiments of the invention.

FIG. 16 is an isometric view of another illustrative embodiment of the invention in the form of a spray head 1600 configured for mounting within a vertically-oriented pneumatic cylinder having a cylindrical interior cross section. As shown in FIG. 16, the spray head 1600 has the form of a round, straight-sided torus approximately 58 cm in exterior diameter. In other embodiments it has other shapes (e.g., disc, square) and dimensions. The faceplate 1610 of the spray head 1600 contains a number of countersinks 1620 each of which houses a nozzle 1630. The nozzles 1630 are arranged in concentric rings centered on the central hole 1640 of spray head 200 such that each nozzle 1630 is approximately 7 cm from each of its six nearest neighbors. Other arrangements of nozzles 1630 may be employed, e.g., a triangular grid as depicted in FIG. 9.

The spray head 1600 may be mounted horizontally within a vertically-oriented cylinder with its faceplate 1610 facing downward at the top of a gas-filled chamber within the cylinder (such as in, e.g., cylinder assembly 102). A piston shaft typically passes snugly through the circular central opening 1640, and the lateral surface 1650 of the spray head 1600 is typically in snug contact with the cylindrical inner wall of the cylinder. The open horizontal area at the top of the cylinder chamber is preferably wholly occupied by the faceplate 1610. The spray head 1600 is primarily affixed to a cylinder by means of through-holes 1660 that enable the spray head 1600 to be bolted to the inside of the cylinder.

Figure 17:
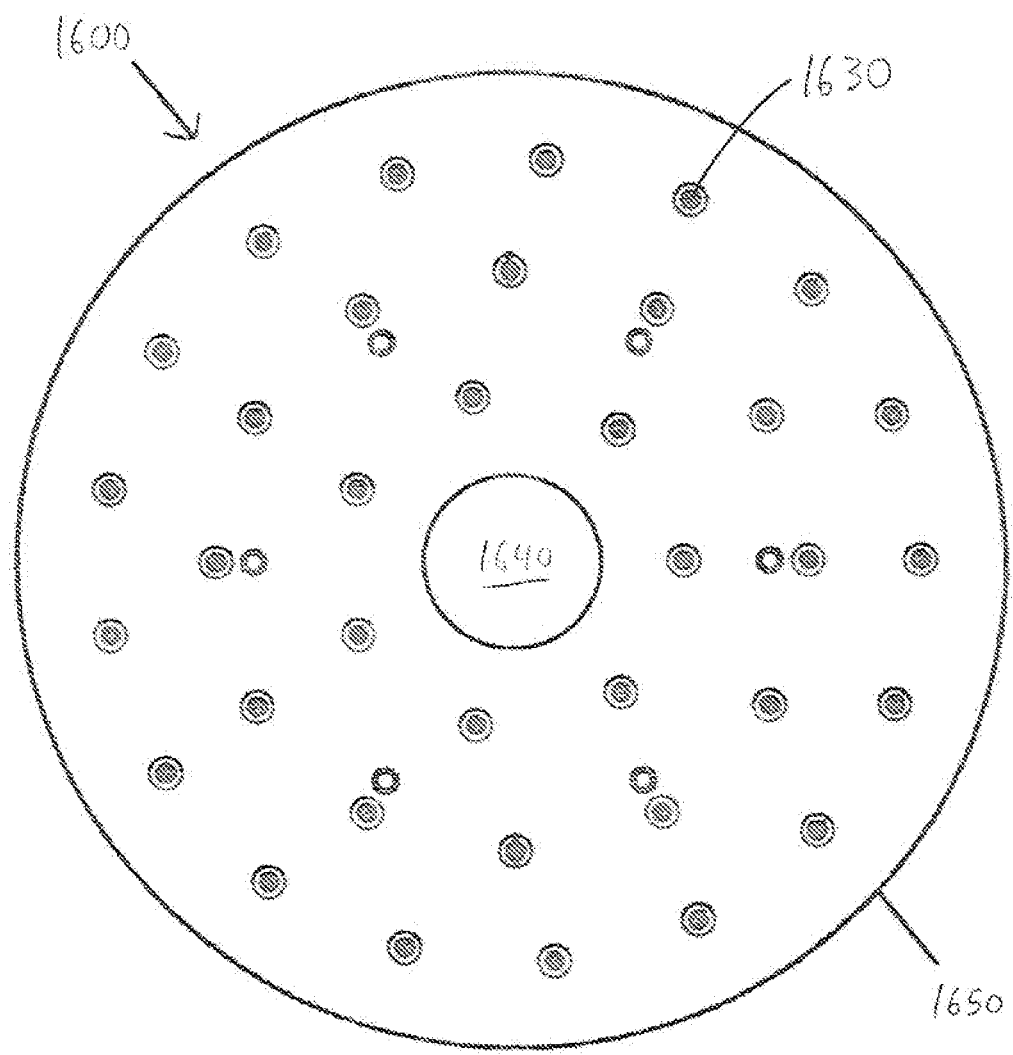
FIG. 17 is a plan view of the spray head of FIG. 16.

FIG. 17 is a plan view of the lower surface of the spray head 1600. When the spray head 1600 is installed, the hole 1640 is typically at least substantially filled with the cylinder piston rod and the lateral surface 1650 of the spray head 1600 is in contact with the interior wall of the cylinder. In this view, in one state of operation, liquid spray (not shown) is directed out of the page. As described above with reference to FIG. 11, due to air resistance, the spray droplets in the spray cone from each spray-head nozzle will travel a limited horizontal distance before beginning to fall approximately vertically (i.e., out of the page) at their terminal velocity. Each orifice therefore tends to produce a column of vertically falling droplets centered under it. In various embodiments of the invention, the nozzles 1630 are spaced so that when liquid is being injected into gas at an appropriate injection pressure, the columns of falling spray overlap or interact with each other, entirely or almost entirely filling the column of gas contained within the chamber of the cylinder and maximizing the rate of liquid-gas heat transfer.

Figure 18:
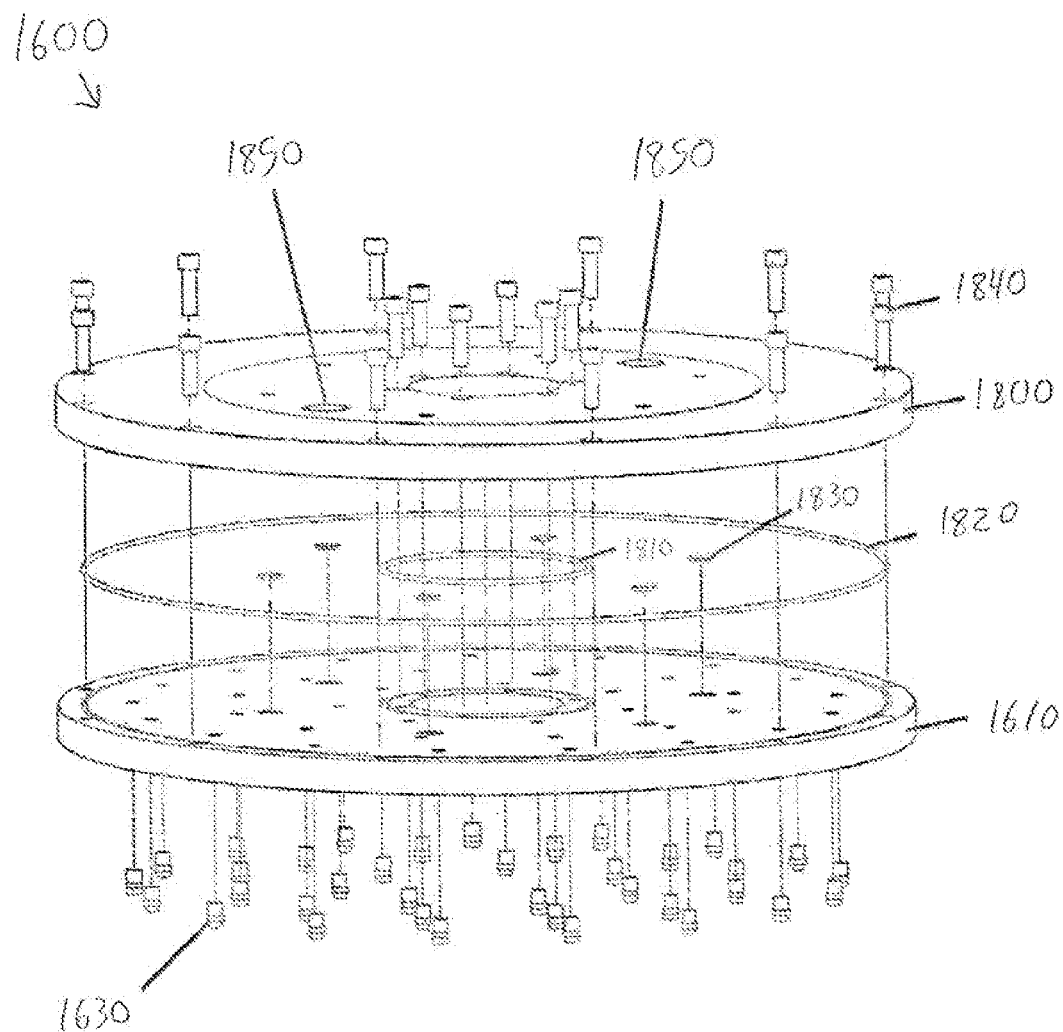
FIG. 18 is an assembly view of the spray head of FIG. 16.

FIG. 18 is an assembly view of spray head 1600, which as shown includes a faceplate 1610 and a base plate 1800, sealed together via inner o-ring 1810, outer o-ring 1820, and bolt o-rings 1830, and connected via a number of connecting bolts 1840. Nozzles 1630 may be threaded into tapered, countersunk holes in faceplate 1610. Water (and/or another suitable heat-transfer fluid) is directed from an external source into the spray head 1600 via two inlet ports 1850.

Figure 19:
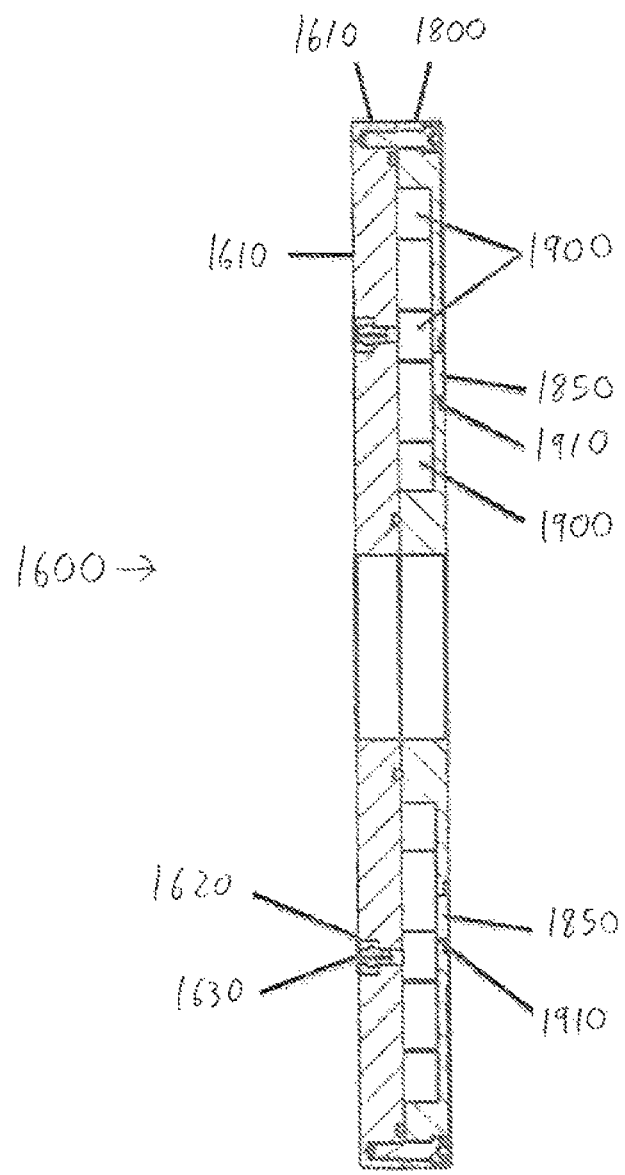
FIG. 19 is an axial cross section of the spray head of FIG. 16.

FIG. 19 is an axial cross section of spray head 1600 in which the faceplate 1610 is shown edge-on. Three interconnected toroidal or ring-shaped channels 1900 (visible in cross-section) are disposed in the inner surface of the base plate 1800 and direct heat-transfer fluid from the inlet ports 1850 to the nozzles 1630. During operation of the spray head 1600, channels 1900 are typically partially or substantially filled with a pressurized liquid from an exterior source admitted through inlets in the upper end of the cylinder (not shown). When the spray head 1600 is bolted into position, o-rings within o-ring grooves 1910 seal the spray head 1600 against the inside of a cylinder.

Figure 20:
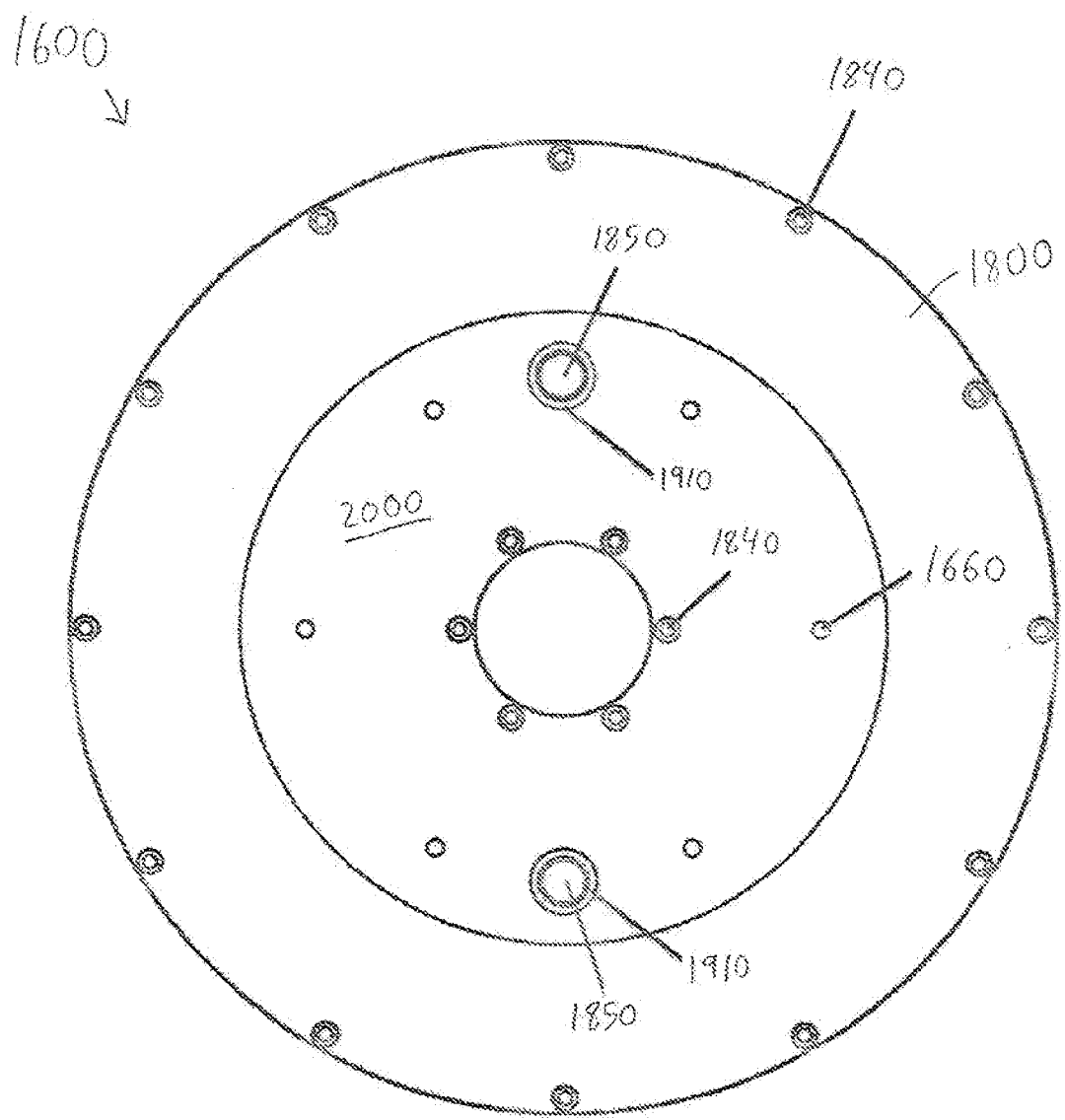
FIG. 20 is bottom view of the spray head of FIG. 16.

FIG. 20 is a rear or bottom view of the spray head 1600, in which the inlet ports 1850 through base plate 1800 are clearly visible, as are the connecting bolts 1840 and the mounting through-holes 1660. Annular area 2000 is preferably smoothly polished so that o-rings in o-ring grooves 1910 seal well when spray head 1600 is mounted to the inside of a cylinder.

Figure 21:
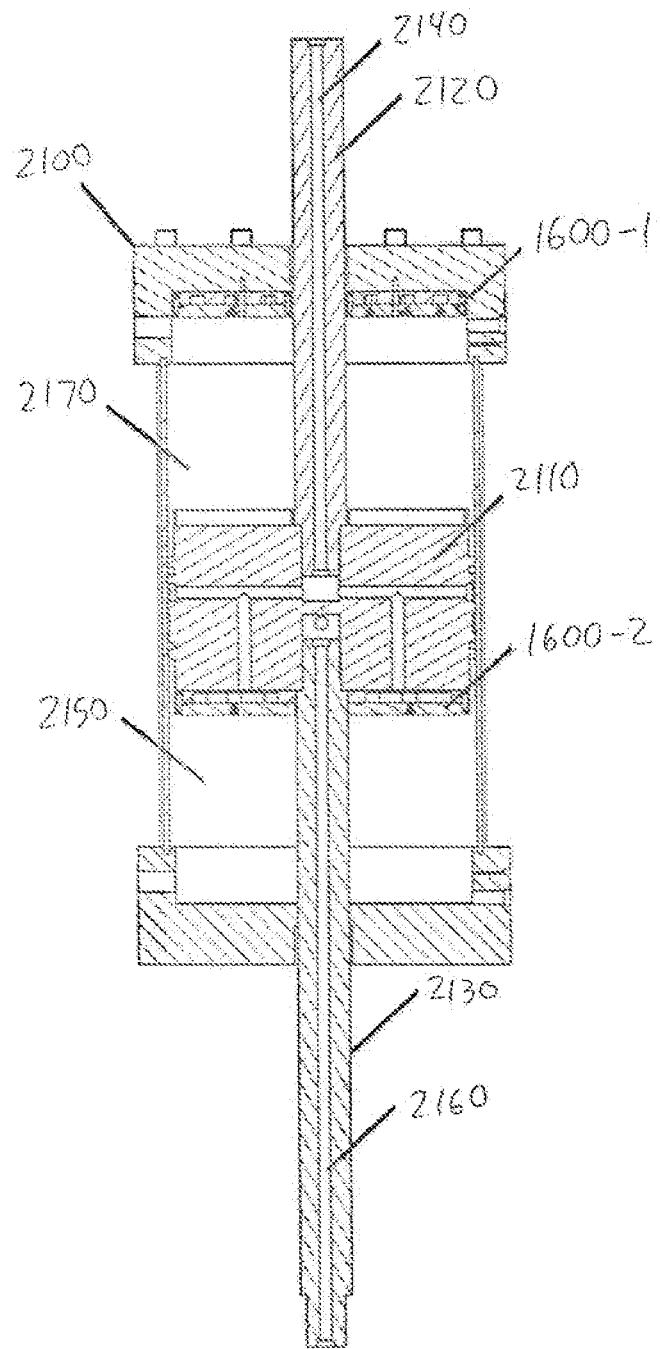
FIG. 21 is an axial cross section of a double-acting pneumatic cylinder incorporating two of the spray heads shown in FIG. 16.

FIG. 21 is a cross-sectional side view of one embodiment incorporating a spray mechanism as described herein. A cylinder 2100 contains a piston 2110 that is attached to two shafts 2120, 2130 that pass through opposite ends of the cylinder 2100. One spray head 1600-1 may be mounted in the upper end of the cylinder 2100. A second spray head 1600-2 may be mounted on the lower surface of the piston 2110. Liquid may be conveyed to the upper spray head 1600-1 directly through the upper end of the cylinder. A center-drilled channel 2140 within shaft 2120 enables water to be conveyed to the spray head 1600-2 mounted on the piston 2110, thus enabling introduction of a liquid spray into the lower chamber 2150. A center-drilled channel 2160 within shaft 2130 enables water to be conveyed out of the upper chamber 2170 of the cylinder 2100. A system of channels for the introduction of liquid to and the removal of liquid from the chambers of a pneumatic cylinder as described in the '513 application may be utilized with various embodiments of the invention.

In the illustrative application shown in FIG. 21, the cylinder 2100 may compress or expand gas in either chamber and is, therefore, double-acting. For example, if the cylinder is being used to extract mechanical work from the expansion of a gas in the upper chamber 2170, the upper spray head 1600-1 may be used to perform liquid-gas heat exchange during the expansion, during which the piston 2110 moves downward. Similarly, the lower spray head 1600-2 may be used during the expansion of a gas in the lower chamber 2150, during which the piston 2110 moves upward. Whatever mode of operation is chosen, atomized sprays from the orifices of the active spray head 1600-1 and/or 1600-2 preferably form vertical, interacting (and/or overlapping) cylinders of falling droplets that exchange heat with all or nearly all of the interior of the chamber 2150 and/or 2170 being injected with liquid. In various applications, both spray heads 1600-1, 1600-2 are employed simultaneously.

Figure 22A:
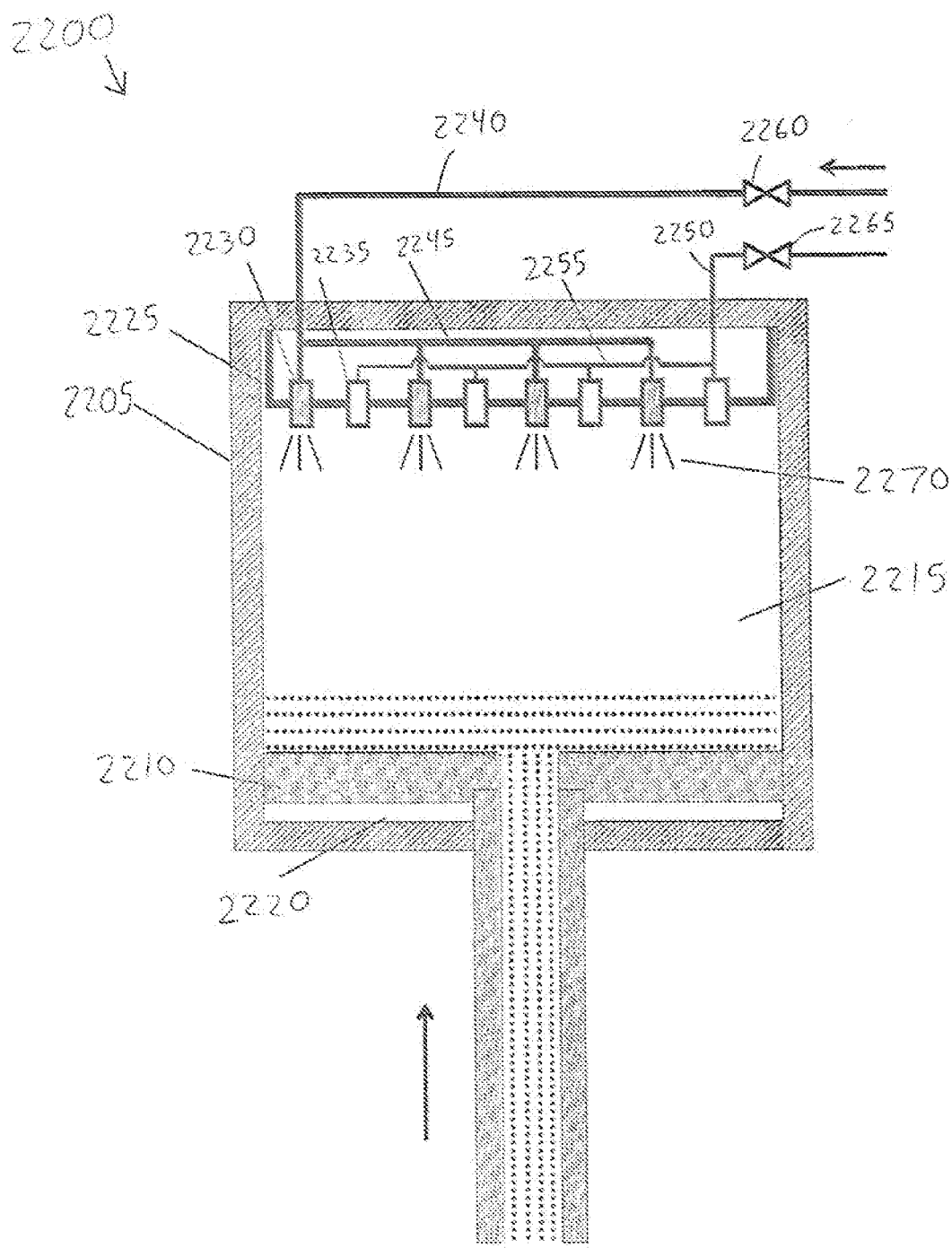
FIG. 22A is a schematic drawing of a pneumatic expander-compressor cylinder into which a heat-exchange liquid is injected in accordance with various embodiments of the invention.

Spray mechanisms (e.g., spray heads) in accordance with various embodiments of the invention may incorporate multiple individually controllable groups of nozzles (each of which may include, e.g., one or more nozzles) utilized to introduce heat-transfer fluid into a gas in order to thermally condition the gas during, e.g., expansion and/or compression of the gas. FIG. 22A depicts portions of an illustrative system 2200 that compresses and/or expands gas. System 2200 includes a cylinder 2205 (that may be vertically oriented, as shown) containing a mobile piston 2210 that divides the interior of the cylinder 2205 into a gas-filled (pneumatic) chamber 2215 and a liquid-filled (hydraulic) chamber 2220. Alternatively, both chambers 2215 and 2220 may be gas-filled.

A spray head 2225 (that may share any number of characteristics with spray heads 900 and 1600 described above) holds in place a number of spray nozzles 2230, 2235 (eight nozzles are shown; only two are labeled explicitly). Two independent sets of spray nozzles are shown, namely (1) the four nozzles 2230 fed by pipe 2240 and manifold 2245, herein termed Nozzle Set 1 and depicted with cross-hatching, and (2) the four nozzles 2235 fed by pipe 2250 and manifold 2255, herein termed Nozzle Set 2 and depicted without cross-hatching. A valve 2260 controls flow of heat-exchange liquid to Nozzle Set 1 and a valve 2265 controls flow of heat-exchange liquid to Nozzle Set 2. Other embodiments are equipped with three or more independently valved nozzle sets and with any number of nozzles in each set; also, different nozzle sets may contain different nozzle types (for example, any of the nozzle types described above and/or depicted in FIG. 8) or mixtures of nozzle types. The valves 2260, 2265 may be controlled by control system 105 or may be a cracking-pressure type that allows liquid to flow into the spray head 2225 whenever the liquid input pressure exceeds a certain threshold. The valves 2260, 2265 may be identical, or of different types.

In the state of operation shown in FIG. 22A, chamber 2215 contains a quantity of gas undergoing compression. Valve 2265 is closed and valve 2260 is open. Heat-exchange liquid flows through pipe 2240, into manifold 2245, and then into the four spray nozzles 2230 of Nozzle Set 1. The heat-exchange liquid issues from Nozzle Set 1 as a spray 2270 that thermally conditions (i.e., exchanges heat with) the gas in chamber 2215. Little or no spray issues from the four spray nozzles 2235 of Nozzle Set 2. Thus, Nozzle Set 1 is "active" and Nozzle Set 2 is not.

Figure 22B:
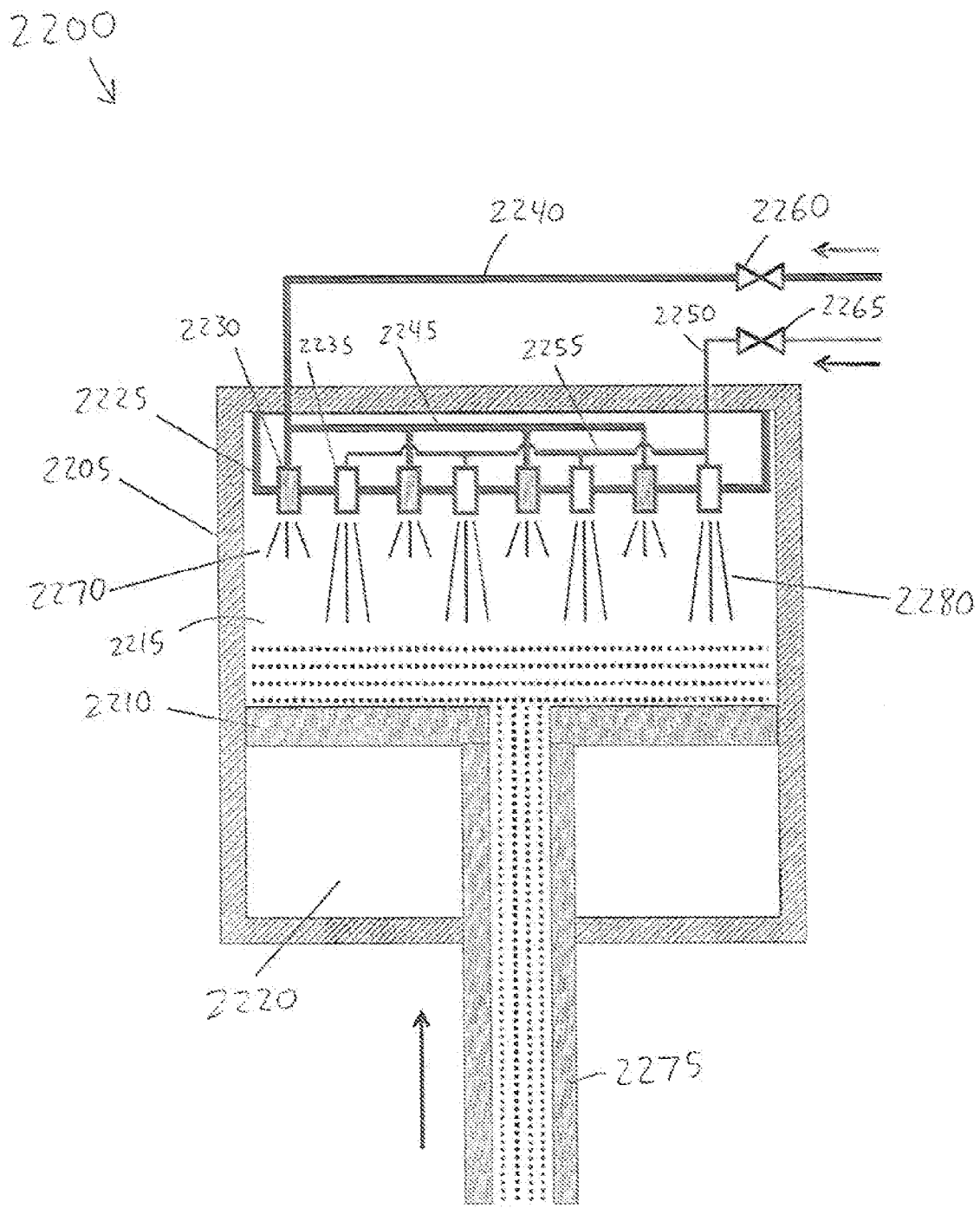
FIG. 22B is the system of FIG. 22A in a different state of operation.

FIG. 22B depicts the system 2200 in a state of operation different from that shown in FIG. 22A. In the state of operation depicted in FIG. 22B, the piston 2210 and rod 2275 have moved closer to the spray head 2225 than in FIG. 22A and the gas in chamber 2215 is more compressed. In this or some other state(s) of operation it may be intended that the rate of heat exchange between the gas in chamber 2215 and the heat-exchange spray 2270 be increased. As depicted in FIG. 22B, the amount of spray falling into chamber 2215 may be increased by allowing heat-exchange liquid to pass through Nozzle Set 2. In FIG. 22B, valve 2260 is open. Heat-exchange liquid flows through pipe 2240, into manifold 2245, and then into the four spray nozzles 2230 of Nozzle Set 1. Valve 2265 is also open, so that heat-exchange liquid flows through pipe 2250, into manifold 2255, and then into the four spray nozzles 2235 of Nozzle Set 2. Thus, in this state of operation, spray issues from both Nozzle Set 1 and Nozzle Set 2. In this illustrative embodiment, Nozzle Set 2 contains nozzles of a different design (e.g., being of a different type and/or having a different size and/or throughput) from those in Nozzle Set 1 and produces a spray 2280 of, e.g., heavier droplets that fall more rapidly through the gas in chamber 2215 than does the spray 2270 from Nozzle Set 1 (and/or a greater volume of droplets than is produced by Nozzle Set 1). It will be clear to any person familiar with the art of pneumatic and hydraulic cylinders that system 2200 may be operated in reverse, that is, to expand gas rather than compress it.

The use of two or more independently operable nozzle sets, as in, e.g., FIG. 22A and FIG. 22B, allows an operator to control spray quality and quantity as gas pressure in the pneumatic cylinder (e.g., 2205) varies over a single stroke or over the course of multiple piston strokes. For example, a given flow rate of liquid sprayed into a cylinder chamber for heat transfer produces a certain rate of heat transfer (i.e., heat-transfer power) for a given spray character and initial temperature difference between the gas in the chamber and the liquid entering the chamber. If the power of a compression or expansion—that is, the rate at which the gas in the cylinder performs work on the piston, or at which the piston performs work on the gas—increases during a piston stroke, a higher flow rate of liquid may be utilized to maintain substantially isothermal compression or expansion. Under such conditions, by activating a second (or third, or fourth, etc.) set of nozzles, the higher flow rate may be achieved with the same through-nozzle pressure drop as with the lower flow rate for a single nozzle set, or at least without increasing the through-nozzle pressure drop as much as would be required by a similar increase of flow rate through a single nozzle set. Likewise, if compression or expansion power decreases, a lower flow rate of liquid may be utilized, and this may be achieved by de-activating one or more nozzle sets. Moreover, different nozzle sets may provide different spray qualities and average drop sizes for similar flow rates and pressure drops. In some instances, larger droplets may be advantageous for rapid coverage of a cylinder volume (due to their higher terminal velocity), whereas smaller droplets may be advantageous for heat transfer (due to their larger surface area). In some such instances, two or more sets of nozzles may be activated to produce a bi-modal (or multi-modal) distribution of droplet sizes, achieving both full volume coverage and rapid heat transfer in an efficient (i.e., low-pumping-power) manner.

In FIGS. 22A and 22B, Nozzle Set 1 and Nozzle Set 2 (and/or any other nozzle sets) may be individually and/or collectively controlled by control system 105 based at least in part upon the pressure within chamber 2215 and/or chamber 2220. For example, control system 105 may be responsive to a pressure sensor that measures the pressure within chamber 2215 and/or chamber 2220. The number of individually controllable nozzle sets spraying heat-transfer fluid into a chamber may be increased with increasing pressure within the chamber(s) (and vice versa) in order to more efficiently exchange heat with the gas within the chamber(s).

Figure 23:
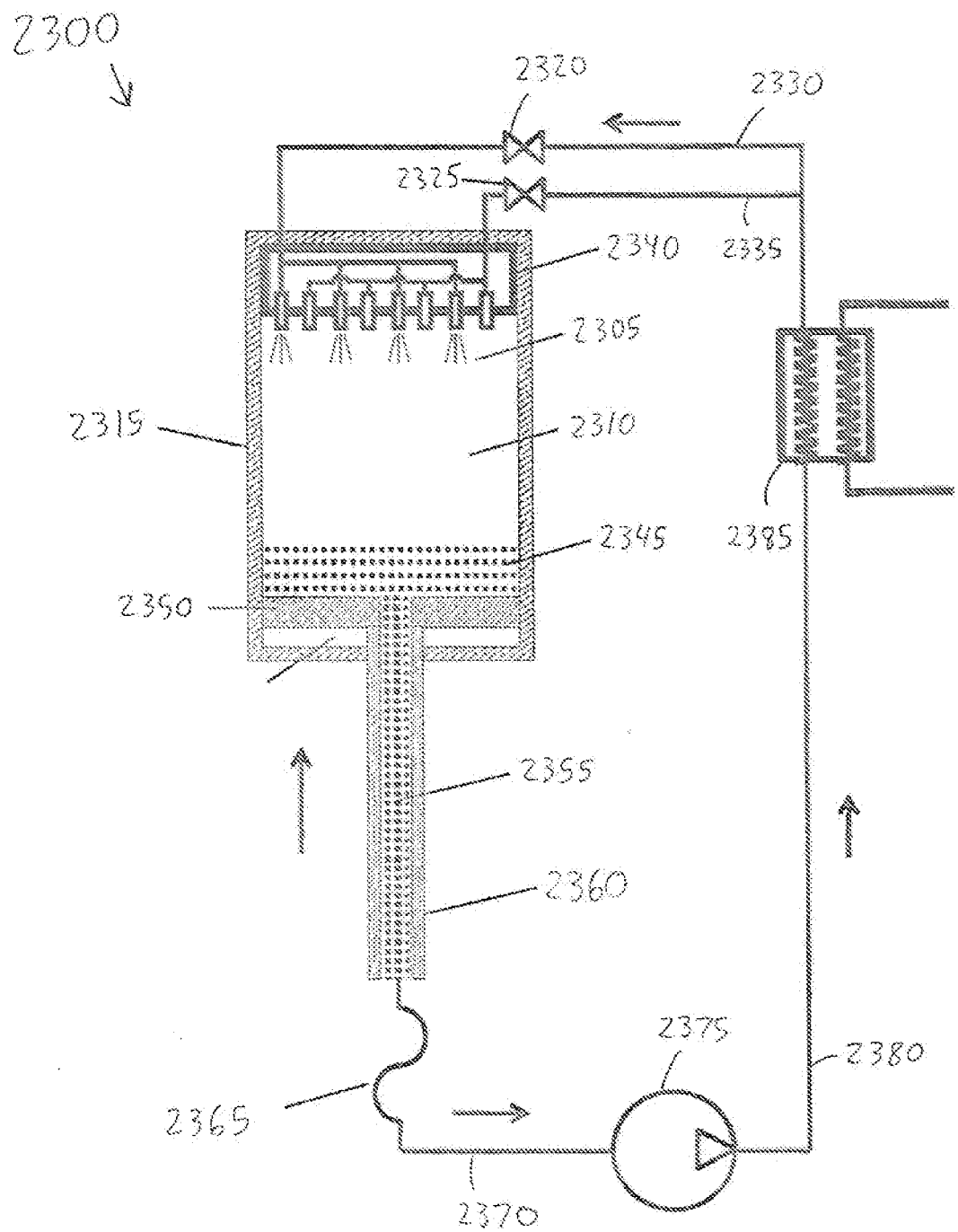
FIG. 23 is a schematic diagram of portions of a compressed-air energy storage and recovery system in accordance with various embodiments of the invention.

The system 2300 in FIG. 23 generally resembles the system 100 in FIG. 1 except for the means by which heat-exchange spray 2305 (136 in FIG. 1) is produced in an upper chamber 2310 of a cylinder 2315. System 2300 operates in accordance with embodiments of the invention described above with relation to FIGS. 22A and 22B. The operation of the cylinder 2315 in FIG. 23 may be identical to that of cylinder 2205 depicted in FIGS. 22A and 22B. In FIG. 23, valve 2320 is open and valve 2325 is closed. Valves 2320, 2325 enable heat-exchange liquid to pass through pipes 2330 and/or 2335 into at least one of the two sets of spray nozzles incorporated into spray head 2340 (which may also share any number of features with spray heads 900 and/or 1600 described above). In other embodiments, a spray rod or other contrivance for mounting the spray nozzles is employed. Heat-exchange liquid 2345 issues from Nozzle Set 1 in spray head 2340 as spray 2305 that may accumulate on the upper surface of a piston 2350. A center-drilled channel 2355 in a rod 2360 enables the heat-exchange liquid 2345 to be withdrawn through a flexible hose 2365 and through a pipe 2370 to 2a pump 2375 (which may be similar or identical to pump 124 described above with reference to FIG. 1). In other embodiments, alternate techniques of conducting the heat-exchange liquid 2345 to pump 2370 are employed, such as internal piping as described in U.S. Provisional Patent Application No. 61/384,814, filed Sep. 21, 2010, the entire disclosure of which is incorporated by reference herein. Exiting the pump 2375, the heat-exchange liquid is preferably conveyed by a pipe 2380 to a heat exchanger 2385 where its temperature may be altered (e.g., to maintain the heat-exchange liquid at a substantially constant desired temperature as it enters cylinder 2315). Exiting the heat exchanger 2385, the heat-exchange liquid enters pipes 2330 and 2335. In the state of operation depicted in FIG. 23, liquid is prevented from flowing through pipe 2335 because valve 2325 is closed. In another state of operation (not shown), valves 2320 and 2325 are both open and spray head 2340 produces spray from multiple sets of nozzles, e.g., in the manner depicted for spray head 2225 in FIG. 22B. It will be clear to any person familiar with the art of pneumatic and hydraulic cylinders that system 2300 may be operated in reverse, that is, to expand gas rather than compress it.

The pneumatic cylinders shown herein may be outfitted with an external gas heat exchanger instead of or in addition to liquid sprays. An external gas heat exchanger may also allow expedited heat transfer to or from the high-pressure gas being expanded (or compressed) in the cylinders. Such methods and systems for isothermal gas expansion (or compression) using an external heat exchanger are shown and described in the '426 patent.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compressed-gas energy storage and recovery system comprising:
    a cylinder assembly comprising a first pneumatic chamber for compressing gas to store energy and expanding gas to recover energy and a second pneumatic chamber, separated from the first pneumatic chamber;
    selectively fluidly connected to the first chamber, (i) a compressed-gas reservoir for storage of gas after compression and supply of compressed gas for expansion thereof, and (ii) a vent for exhausting expanded gas to atmosphere and supply of gas for compression thereof;
    a spray mechanism for introducing heat-transfer fluid within the first chamber of the cylinder assembly to exchange heat with gas therein, thereby increasing efficiency of the energy storage and recovery, the spray mechanism comprising a plurality of nozzles for collectively producing an aggregate spray filling substantially an entire volume of the first chamber; and
    a circulation apparatus for circulating the heat-transfer fluid to the spray mechanism,
    wherein the aggregate spray comprises a plurality of overlapping individual sprays each produced by one of the plurality of nozzles.

2. The system of claim 1, wherein each individual spray is an atomized spray of individual droplets.

3. The system of claim 2, wherein the individual droplets have an average diameter ranging from approximately 0.2 mm to approximately 1 mm.

4. The system of claim 1, wherein the plurality of nozzles maintains a Weber value of gas within the chamber of at least 40.

5. The system of claim 1, wherein each nozzle maintains a pressure drop thereacross of less than approximately 50 psi.

6. The system of claim 1, wherein at least one nozzle has a divergent cross-sectional profile.

7. The system of claim 1, wherein at least one nozzle comprises a mechanism for breaking up a flow of heat-transfer fluid therethrough.

8. The system of claim 7, wherein the mechanism comprises at least one of a plurality of vanes or a corkscrew.

9. The system of claim 1, wherein the spray mechanism comprises an interior channel for transmitting heat-transfer fluid from a source external to the cylinder assembly to the plurality of nozzles.

10. The system of claim 1, further comprising, connected to the cylinder assembly, an intermittent renewable energy source of wind or solar energy, wherein (i) energy stored during compression of gas originates from the intermittent renewable energy source, and (ii) energy is recovered via expansion of gas when the intermittent renewable energy source is nonfunctional.

11. The system of claim 1, wherein the spray mechanism comprises at least one of a spray head or a spray rod.

12. The system of claim 1, further comprising a heat exchanger for maintaining the heat-transfer fluid at a substantially constant temperature, wherein the circulation apparatus circulates heat-transfer fluid from the cylinder assembly through the heat exchanger and back to the cylinder assembly.

13. A compressed-gas energy storage and recovery system comprising:
a cylinder assembly comprising a chamber for compressing gas to store energy and expanding gas to recover energy;
selectively fluidly connected to the chamber, (i) a compressed-gas reservoir for storage of gas after compression and supply of compressed gas for expansion thereof, and (ii) a vent for exhausting expanded gas to atmosphere and supply of gas for compression thereof;
a spray mechanism for introducing heat-transfer fluid within the chamber of the cylinder assembly to exchange heat with gas therein, thereby increasing efficiency of the energy storage and recovery, the spray mechanism comprising a plurality of nozzles for collectively producing an aggregate spray filling substantially an entire volume of the chamber;
a control system for controlling the introduction of heat-transfer fluid into the chamber such that the compression and expansion of gas is substantially isothermal; and
a circulation apparatus for circulating the heat-transfer fluid to the spray mechanism,
wherein the aggregate spray comprises a plurality of overlapping individual sprays each produced by one of the plurality of nozzles.

14. The system of claim 1, wherein the plurality of nozzles is organized into at least two nozzle groups, at least one nozzle group not being active during a portion of a single cycle of compression or expansion.

15. The system of claim 1, further comprising:
a movable piston separating the first chamber from the second chamber within the cylinder assembly; and
a piston rod connected to the movable piston,
wherein the piston and piston rod define a fluid passageway selectively fluidly connected to the circulation apparatus.

16. The system of claim 1, further comprising a reservoir of heat-transfer fluid fluidly connected to the circulation apparatus, the reservoir of heat-transfer fluid containing an additive reducing surface tension of the heat-transfer fluid.

17. The system of claim 1, further comprising a control system for controlling the introduction of heat-transfer fluid into the first chamber such that the compression and expansion of gas is substantially isothermal.

18. The system of claim 13, wherein the chamber is a pneumatic chamber separated from a hydraulic chamber in the cylinder assembly.

19. The system of claim 1, wherein the spray mechanism occupies approximately an entire top surface of the first chamber.

20. A compressed-gas energy storage and recovery system comprising:
a cylinder assembly comprising a first chamber for compressing gas to store energy and expanding gas to recover energy and a second chamber;
selectively fluidly connected to the first chamber, (i) a compressed-gas reservoir for storage of gas after compression and supply of compressed gas for expansion thereof, and (ii) a vent for exhausting expanded gas to atmosphere and supply of gas for compression thereof;
a spray mechanism for introducing heat-transfer fluid within the first chamber and second chamber of the cylinder assembly to exchange heat with gas therein, thereby increasing efficiency of the energy storage and recovery, the spray mechanism comprising a plurality of nozzles disposed in the first chamber and second chamber for collectively producing an aggregate spray filling substantially an entire volume of the chambers; and
a circulation apparatus for circulating the heat-transfer fluid to the spray mechanism,
wherein the aggregate spray comprises a plurality of overlapping individual sprays each produced by one of the plurality of nozzles.

* * * * *